US012030205B2

(12) United States Patent
Yamada

(10) Patent No.: US 12,030,205 B2
(45) Date of Patent: Jul. 9, 2024

(54) SHEET PROCESSING APPARATUS

(71) Applicant: DUPLO SEIKO CORPORATION, Kinokawa (JP)

(72) Inventor: Kenta Yamada, Kinokawa (JP)

(73) Assignee: DUPLO SEIKO CORPORATION, Kinokawa (JP)

( * ) Notice: Subject to any disclaimer, the term of this patent is extended or adjusted under 35 U.S.C. 154(b) by 220 days.

(21) Appl. No.: 17/730,544

(22) Filed: Apr. 27, 2022

(65) Prior Publication Data

US 2022/0356035 A1 Nov. 10, 2022

(30) Foreign Application Priority Data

May 7, 2021 (JP) ................................ 2021-079283

(51) Int. Cl.
*B26D 7/22* (2006.01)
*B26D 1/24* (2006.01)
(Continued)

(52) U.S. Cl.
CPC ............... *B26D 7/22* (2013.01); *B26D 1/245* (2013.01); *B26D 5/00* (2013.01); *B26D 9/00* (2013.01); *B26F 1/08* (2013.01); *B26F 1/20* (2013.01); *B26F 1/24* (2013.01); *B65H 5/02* (2013.01); *B65H 5/36* (2013.01); *B65H 35/0086* (2013.01); *B65H 35/02* (2013.01); *B65H 43/00* (2013.01); *B65H 2404/511* (2013.01);
(Continued)

(58) Field of Classification Search
CPC .. B65H 5/36; B65H 35/0086; B65H 2404/66; B65H 2404/7414; B65H 35/02; B26F 1/08; B62D 5/00
See application file for complete search history.

(56) References Cited

FOREIGN PATENT DOCUMENTS

| | | | |
|---|---|---|---|
| JP | 4627906 B2 * | 2/2011 | |
| JP | 4627906 B2 | 2/2011 | |

OTHER PUBLICATIONS

Office Action (Communication) issued on Oct. 11, 2022, by the European Patent Office in corresponding European Patent Application No. 22171696.2. (7 pages).

* cited by examiner

*Primary Examiner* — Jeremy R Severson
(74) *Attorney, Agent, or Firm* — BUCHANAN INGERSOLL & ROONEY PC

(57) ABSTRACT

In a sheet processing apparatus including a guide member that rotates by contact with a sheet processing unit, collision of the sheet processing unit with the guide member in a rotating state is avoided. A sheet conveyance apparatus includes: sheet processing units that move along one movement path intersecting a conveyance direction of a sheet; guide members that each include a fixed end rotatable about a rotation center line and support the sheet from below; a biasing member that biases the guide member so as to return to an original orientation in which a part of the guide member is located on the movement path; and a collision determination unit that determines, before at least one of the sheet processing units is moved and based on a movement start position and a target position of a movement target sheet processing unit and a size and an orientation before start of movement of the guide member, whether or not there is a possibility of occurrence of collision of the movement target sheet processing unit with the guide member in a rotating state.

10 Claims, 24 Drawing Sheets

(51) Int. Cl.

| | |
|---|---|
| ***B26D 5/00*** | (2006.01) |
| ***B26D 9/00*** | (2006.01) |
| ***B26F 1/08*** | (2006.01) |
| ***B26F 1/20*** | (2006.01) |
| ***B26F 1/24*** | (2006.01) |
| ***B65H 5/02*** | (2006.01) |
| ***B65H 5/36*** | (2006.01) |
| ***B65H 35/00*** | (2006.01) |
| ***B65H 35/02*** | (2006.01) |
| ***B65H 43/00*** | (2006.01) |

(52) U.S. Cl.

CPC ...... *B65H 2404/62* (2013.01); *B65H 2404/66* (2013.01); *B65H 2404/7414* (2013.01); *B65H 2407/50* (2013.01); *B65H 2601/26* (2013.01)

CASE 1

CASE 1

SHEET PROCESSING APPARATUS

BACKGROUND OF THE INVENTION

Field of the Invention

The present disclosure relates to a sheet processing apparatus that processes a sheet while conveying the sheet.

Description of the Related Art

For example, JP 4627906 B2 discloses a sheet processing apparatus capable of processing a sheet while conveying the sheet. The sheet processing apparatus includes a plurality of sheet processing units each including a processing tool for processing a sheet and being movable in a direction intersecting a conveyance direction of the sheet. The plurality of sheet processing units move along one common movement path. With such a sheet processing unit, a sheet can be processed at an arbitrary position.

The sheet processing apparatus described in JP 4627906 B2 includes a plurality of guide members that support a sheet from below to prevent slack in the sheet when the sheet processing unit processes the sheet. Each of the guide members includes a fixed end at least rotatable about a rotation center line extending in the vertical direction. A part of the guide member is disposed on the movement path of the sheet processing unit, and when a moving sheet processing unit comes into contact with the guide member, the guide member rotates to avoid the sheet processing unit. Note that when the sheet processing unit moves to a position not in contact with the guide member, the guide member is biased by a biasing member and returns to the original orientation in which a part of the guide member exists on the movement path.

SUMMARY OF THE INVENTION

However, in the case of the sheet processing apparatus described in JP 4627906 B2, the guide member may be damaged depending on the movement pattern of each of the plurality of sheet processing units. Specifically, a guide member rotated by coming into contact with one sheet processing unit may collide with another sheet processing unit, and as a result, the guide member may be damaged.

In view of the foregoing, an object of the present disclosure is to, in a sheet processing apparatus including a plurality of sheet processing units movable in a direction intersecting a conveyance direction of the sheet and a guide member supporting the sheet and rotating by contact with a sheet processing unit, avoid collision of a sheet processing unit with the guide member in a rotating state.

In order to solve the above problem, according to one aspect of the present disclosure, provided is a sheet processing apparatus including:

a conveyance unit that conveys a sheet in a first direction;

at least one of sheet processing units that is movable along one movement path extending in a second direction intersecting the first direction in plan view of the sheet;

a guide member that supports the sheet from below, the guide member including a fixed end that is at least rotatable about a rotation center line extending in a vertical direction and disposed at a position out of the movement path;

a biasing member that biases the guide member so as to return to an original orientation in which a part of the guide member is located on the movement path;

a controller that controls movement of the sheet processing units; and a collision determination unit that determines, before the controller moves at least one of the sheet processing units and based on a movement start position and a target position of a movement target sheet processing unit and a size and an orientation before start of movement of the guide member, whether or not there is a possibility of occurrence of collision of the movement target sheet processing unit with the guide member in a rotating state.

According to the present disclosure, in a sheet processing apparatus including a plurality of sheet processing units movable in a direction intersecting a conveyance direction of a sheet and a guide member supporting the sheet and rotating by contact with the sheet processing unit, it is possible to avoid collision of the sheet processing unit with the guide member in a rotating state.

DESCRIPTION OF THE PREFERRED EMBODIMENT

Figure 1:
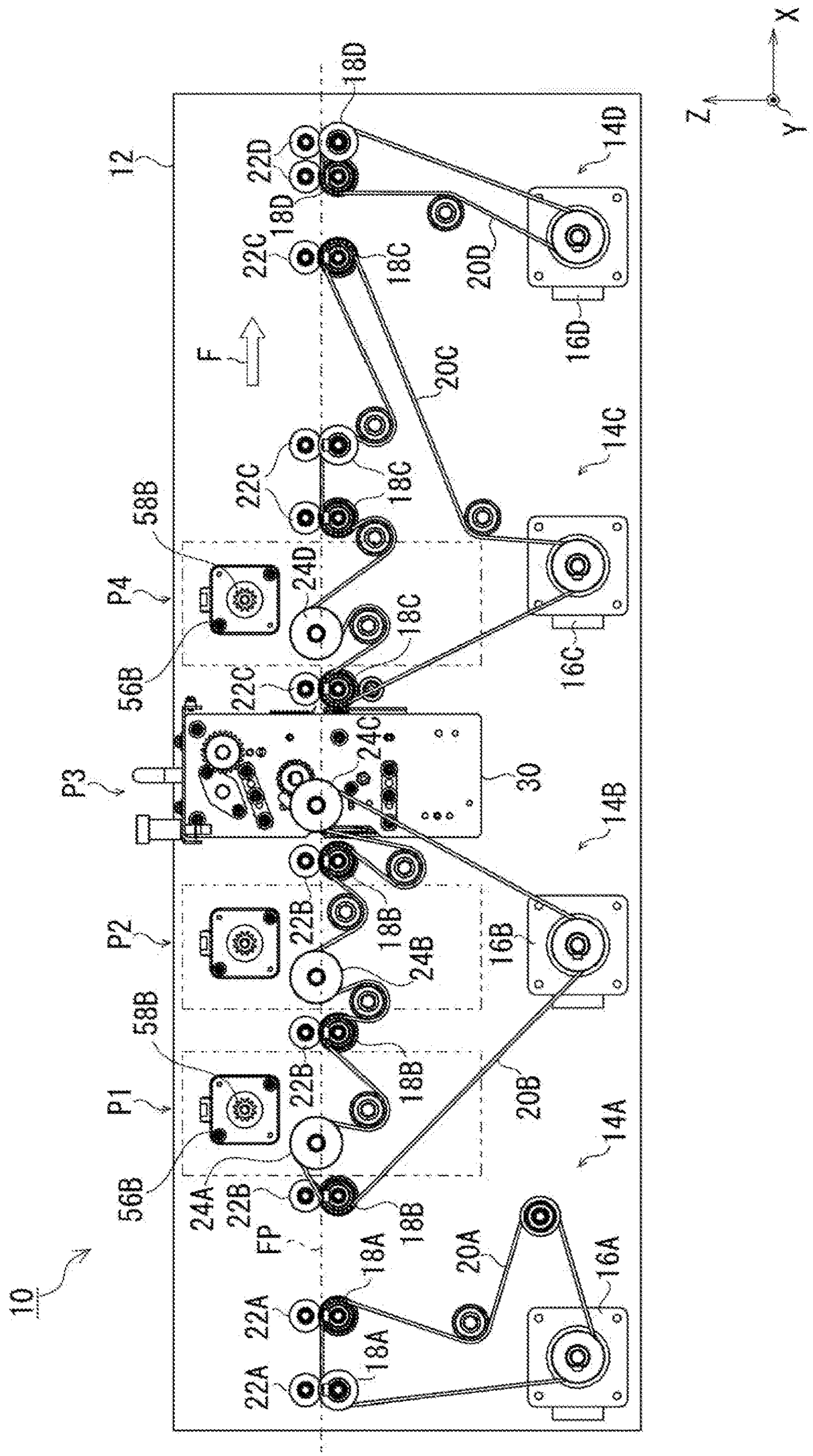
FIG. 1 is a schematic configuration diagram of a sheet processing apparatus.

Hereinafter, an embodiment will be described in detail by referring to the drawings where appropriate. Note, however, that unnecessarily detailed description may be omitted. For example, a detailed description of a well-known matter and a repeated description of substantially the same configurations may be omitted. This is to avoid unnecessary redundancy of the following description and to facilitate understanding of those skilled in the art.

Note that the inventors provide the accompanying drawings and the following description in order for those skilled in the art to fully understand the present disclosure, and do not intend to limit the subject matter described in the claims by the accompanying drawings and the following description.

First Exemplary Embodiment

Figure 2:
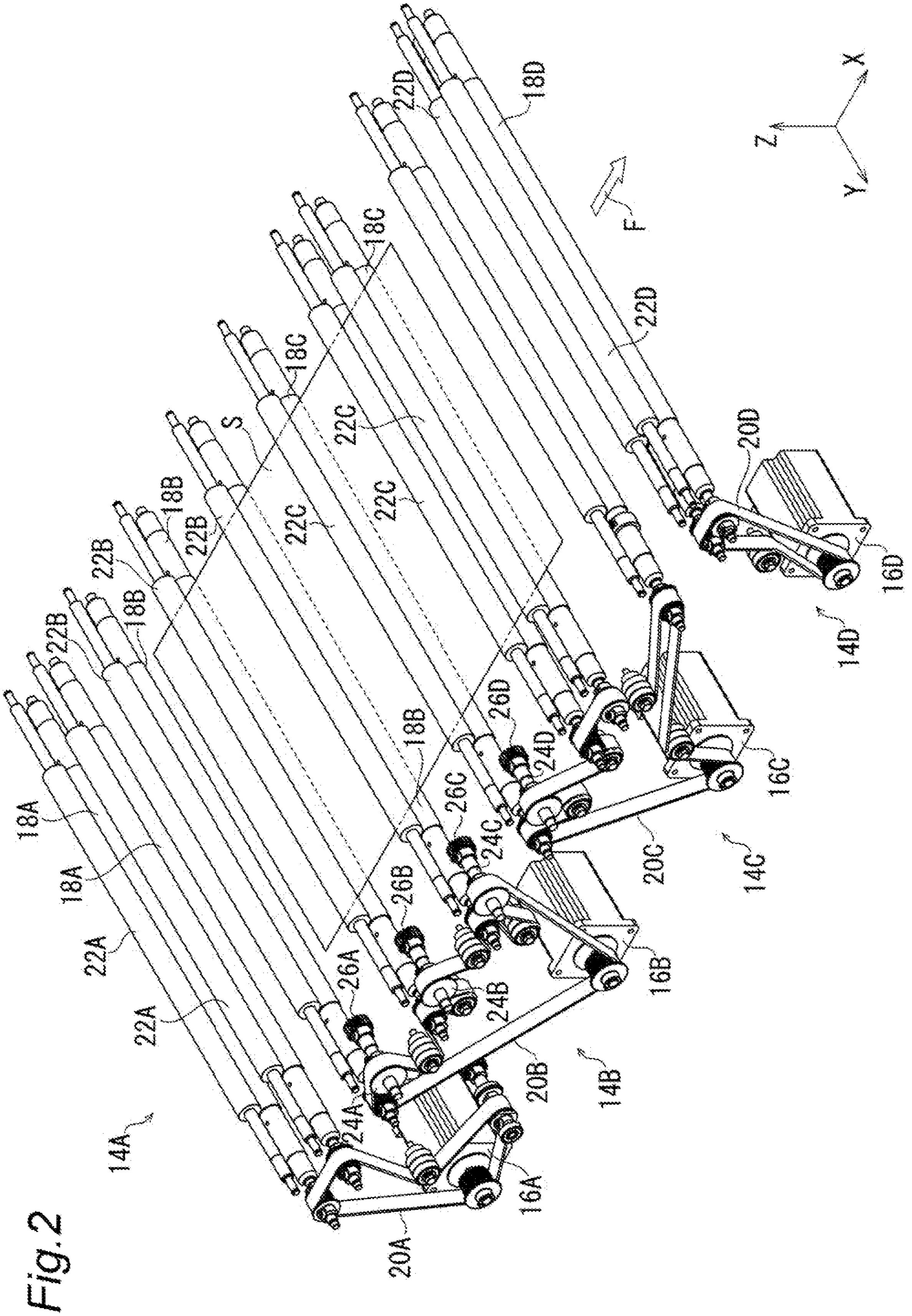
FIG. 2 is a perspective view of a plurality of sheet conveyance units in the sheet processing apparatus.

FIG. 1 is a schematic configuration diagram of a sheet processing apparatus according to an embodiment of the present disclosure. FIG. 2 is a perspective view of a plurality of sheet conveyance units in the sheet processing apparatus. Note that the X-Y-Z orthogonal coordinate system illustrated in the drawings is for facilitating understanding of the present disclosure, and does not limit the present disclosure. The Z-axis direction indicates the vertical direction, and the X-axis direction and the Y-axis direction indicate the horizontal direction. Note that in the present disclosure, the X-axis direction is the sheet conveyance direction, and the Y-axis direction is the left-right direction when viewed from the downstream side in the sheet conveyance direction.

As illustrated in FIGS. 1 and 2, a sheet processing apparatus 10 according to the present embodiment is an apparatus capable of processing a sheet S while conveying the sheet S along a conveyance path FP. The sheet S is, for example, paper, a resin sheet, or the like.

As illustrated in FIG. 1, the sheet processing apparatus 10 includes a casing 12 and a plurality of sheet conveyance units 14A to 14D mounted on the casing 12. Each of the plurality of sheet conveyance units 14A to 14D is configured to convey the sheet S in a conveyance direction F along the conveyance path FP of the sheet S.

As illustrated in FIGS. 1 and 2, the sheet conveyance unit 14A is provided in the casing 12 so as to be located on the most upstream side in the sheet conveyance direction F. The sheet conveyance unit 14A includes a conveyance motor 16A, a plurality of sheet conveyance rollers 18A, and a drive belt 20A that drivingly connects the conveyance motor 16A and the plurality of sheet conveyance rollers 18A. When the conveyance motor 16A rotates, the sheet conveyance roller 18A rotates via the drive belt 20A, and the sheet S on the sheet conveyance roller 18A is sent in the conveyance direction F. Note that in order to maintain contact between the sheet conveyance roller 18A and the sheet S, a presser roller 22A that biases the sheet S toward the sheet conveyance roller 18A is provided for each of the sheet conveyance rollers 18A.

The sheet conveyance unit 14B is provided in the casing 12 so as to be located on the downstream side of the sheet conveyance unit 14A in the conveyance direction F of the sheet S. The sheet conveyance unit 14B includes a conveyance motor 16B, a plurality of sheet conveyance rollers 18B, and a drive belt 20B that drivingly connects the conveyance motor 16B and the plurality of sheet conveyance rollers 18B. When the conveyance motor 16B rotates, the sheet conveyance roller 18B rotates via the drive belt 20B, and the sheet S on the sheet conveyance roller 18B is sent in the conveyance direction F. Note that in order to maintain contact between the sheet conveyance roller 18B and the sheet S, a presser roller 22B that biases the sheet S toward the sheet conveyance roller 18B is provided for each of the sheet conveyance rollers 18B. The sheet conveyance unit 14B also includes a plurality of drive rollers 24A to 24C which are drivingly connected to the conveyance motor 16B via the drive belt 20B to drive a processing tool for performing sheet processing on the sheet S, details of which will be described later. Drive gears 26A to 26C for transmitting power are attached to the tip ends of the drive rollers 24A to 24C.

The sheet conveyance unit 14C is provided in the casing 12 so as to be located on the downstream side of the sheet conveyance unit 14B in the conveyance direction F of the sheet S. The sheet conveyance unit 14C includes a conveyance motor 16C, a plurality of sheet conveyance rollers 18C, and a drive belt 20C that drivingly connects the conveyance motor 16C and the plurality of sheet conveyance rollers 18C. When the conveyance motor 16C rotates, the sheet conveyance roller 18C rotates via the drive belt 20C, and the sheet S on the sheet conveyance roller 18C is sent in the conveyance direction F. Note that in order to maintain contact between the sheet conveyance roller 18C and the sheet S, a presser roller 22C that biases the sheet S toward the sheet conveyance roller 18C is provided for each of the sheet conveyance rollers 18C. The sheet conveyance unit 14C also includes a drive roller 24D which is drivingly connected to the conveyance motor 16C via the drive belt 20C to drive a processing tool that performs sheet processing on the sheet S, details of which will be described later. A drive gear 26D for transmitting power is attached to the tip end of the drive roller 24D.

The sheet conveyance unit 14D is provided in the casing 12 so as to be located on the most downstream side in the sheet conveyance direction F. The sheet conveyance unit 14D includes a conveyance motor 16D, a plurality of sheet conveyance rollers 18D, and a drive belt 20D that drivingly connects the conveyance motor 16D and the plurality of sheet conveyance rollers 18D. When the conveyance motor 16D rotates, the sheet conveyance roller 18D rotates via the drive belt 20D, and the sheet S on the sheet conveyance roller 18D is sent in the conveyance direction F. Note that in order to maintain contact between the sheet conveyance roller 18D and the sheet S, a presser roller 22D that biases the sheet S toward the sheet conveyance roller 18D is provided for each of the sheet conveyance rollers 18D.

As illustrated in FIG. 1, the sheet processing apparatus 10 includes a sheet processing module 30 that processes the sheet S conveyed by the plurality of sheet conveyance units 14A to 14D.

In the case of the present embodiment, as illustrated in FIG. 1, the sheet processing apparatus 10 is configured such that a plurality of sheet processing modules 30 can be mounted on the casing 12 thereof. The plurality of sheet processing modules 30 are detachably mounted at a plurality of mounting positions P1 to P4 indicated by two-dot chain lines. Note that FIG. 1 illustrates a state in which one sheet processing module 30 is mounted at the mounting position P3.

Figure 3A:
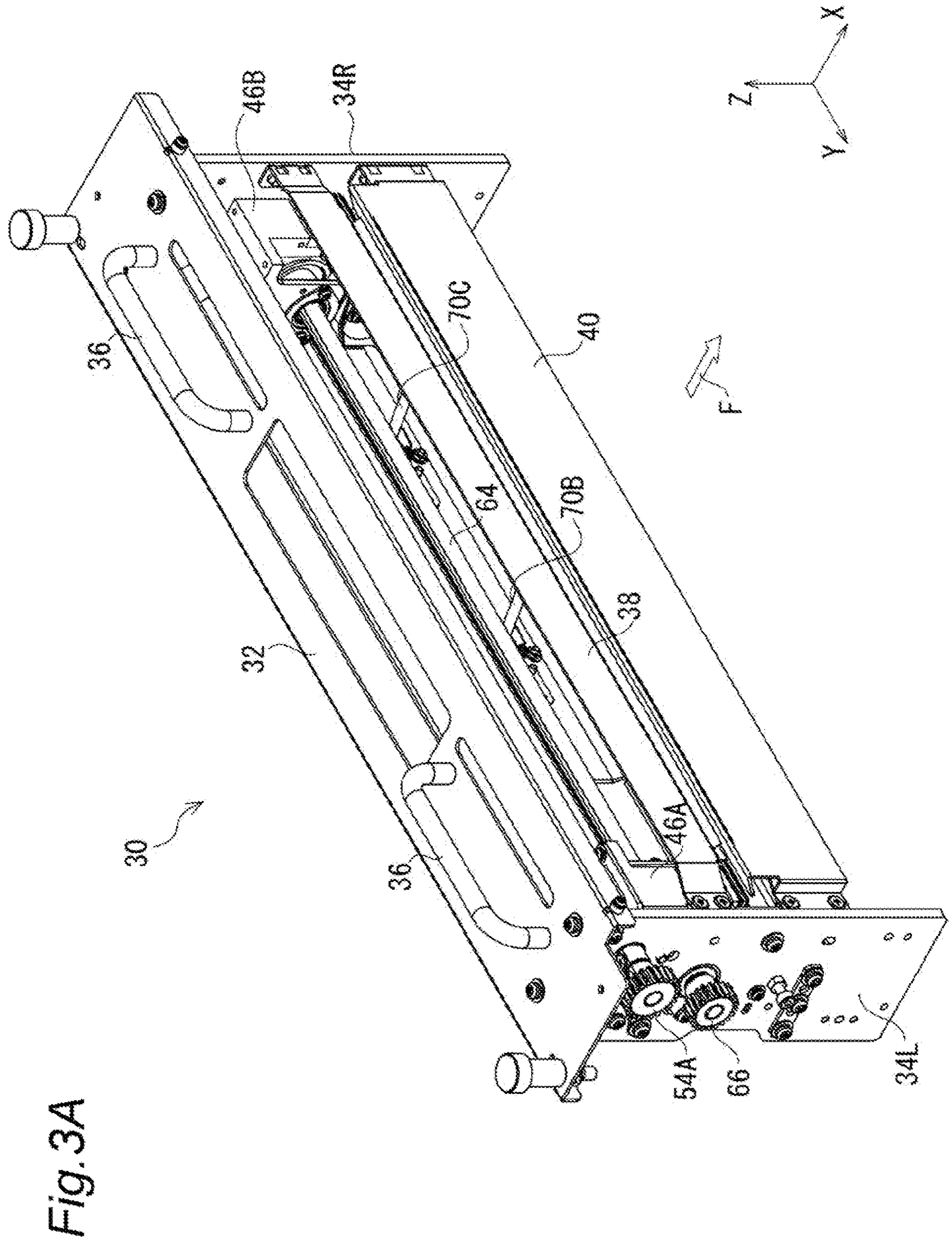
FIG. 3A is a front perspective view of a sheet processing module.
Figure 3B:
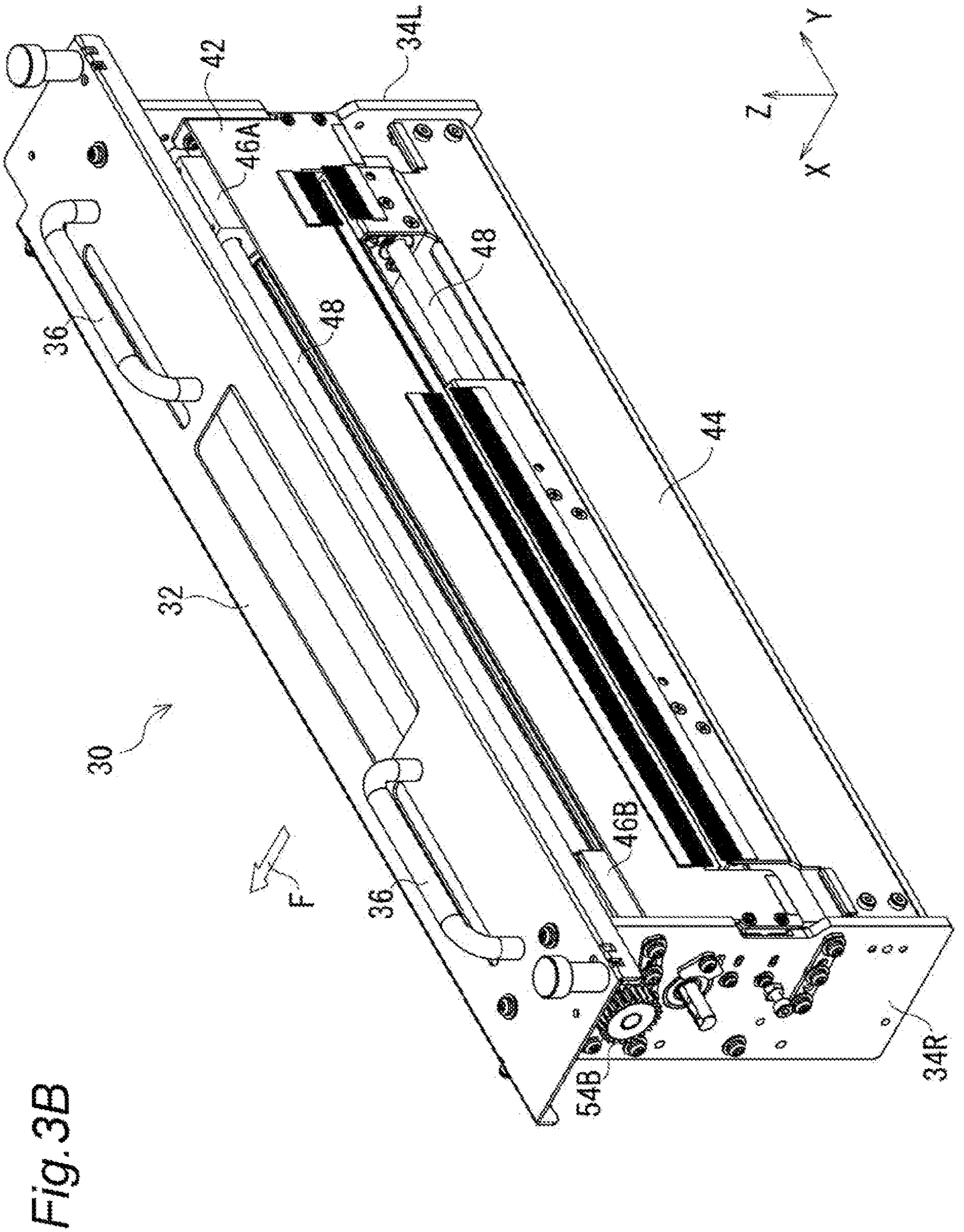
FIG. 3B is a rear perspective view of the sheet processing module.
Figure 4:
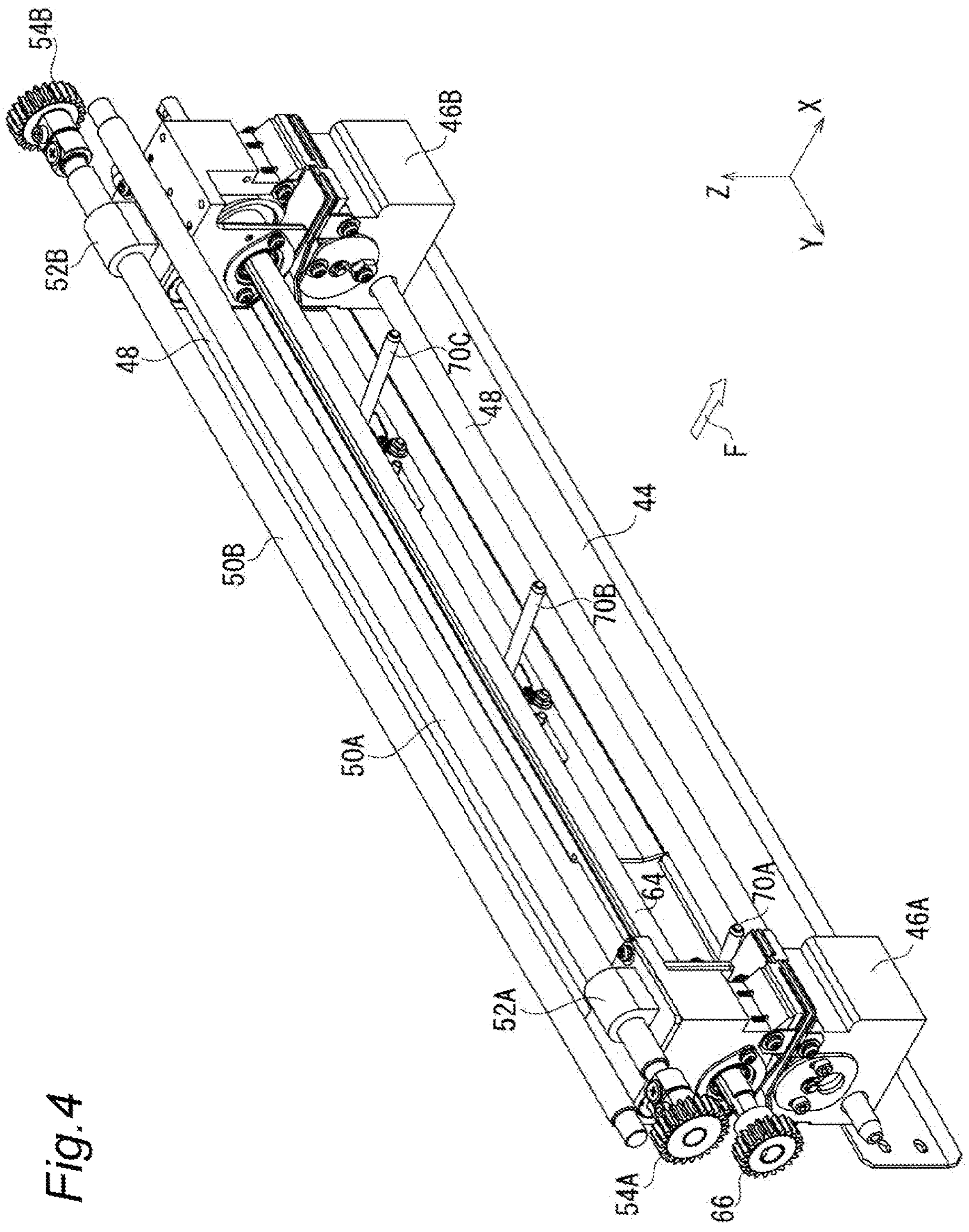
FIG. 4 is a front perspective view illustrating components in the sheet processing module.
Figure 5:
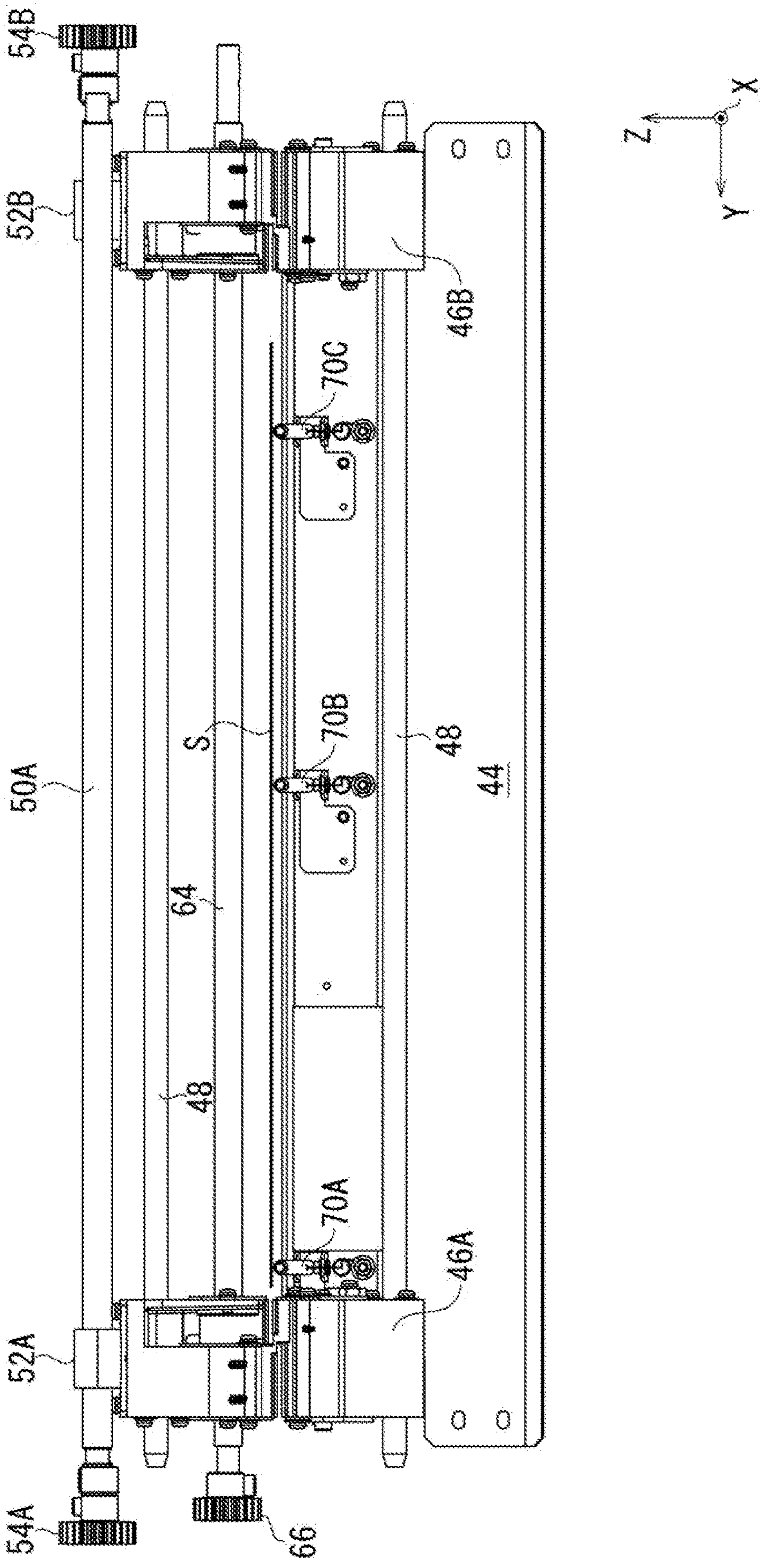
FIG. 5 is a front view illustrating components in the sheet processing module.

FIG. 3A is a front perspective view of the sheet processing module. FIG. 3B is a rear perspective view of the sheet processing module. Further, FIG. 4 is a front perspective view illustrating components in the sheet processing module. FIG. 5 is a front view illustrating components in the sheet processing module.

As illustrated in FIGS. 3A and 3B, the sheet processing module 30 has a substantially rectangular parallelepiped shape, and includes a top plate 32, a right side plate 34R, and a left side plate 34L. The upper end of the right side plate 34R and the upper end of the left side plate 34L are fixed to both ends of the top plate 32 in the left-right direction (Y-axis direction). Note that the top plate 32 is provided with a grip 36 that is held when an operator attaches and detaches the sheet processing module 30 to and from the casing 12.

As illustrated in FIG. 3A, the sheet processing module 30 includes front covers 38 and 40 having one end fixed to the left side plate 34L and the other end fixed to the right side plate 34R. The front covers 38 and 40 are arranged with a gap therebetween in the vertical direction, and the sheet S passes through the gap.

Further, as illustrated in FIG. 3B, the sheet processing module 30 includes back covers 42 and 44 having one end fixed to the left side plate 34L and the other end fixed to the right side plate 34R. The back covers 42 and 44 are arranged with a gap therebetween in the vertical direction, and the sheet S passes through the gap.

As illustrated in FIGS. 4 and 5, the sheet processing module 30 includes a plurality of sheet processing units 46A and 46B that process the sheet S. In the present embodiment, the sheet processing module 30 includes two sheet processing units 46A and 46B.

The plurality of sheet processing units 46A and 46B are substantially rectangular parallelepiped units, and are mounted on the sheet processing module 30 so as to be movable in the left-right direction (Y-axis direction) intersecting the conveyance direction F (X-axis direction) of the sheet S. Specifically, the sheet processing module 30 includes a plurality of guide rods 48 extending in the left-right direction. The movement of the plurality of sheet processing units 46A and 46B is limited to the left-right direction since the plurality of sheet processing units 46A and 46B are supported and guided by the guide rods 48. That is, the plurality of sheet processing units 46A and 46B are supported and guided by the common guide rods 48, and therefore move while being unable to overtake each other on one common movement path.

The sheet processing module 30 includes a drive mechanism for moving the plurality of sheet processing units 46A and 46B in the left-right direction (Y-axis direction). In the case of the present embodiment, the drive mechanism is a ball screw mechanism including two screw shafts 50A and 50B and nuts 52A and 52B engaged with the screw shafts 50A and 50B.

The screw shafts 50A and 50B extend in parallel to each other in the left-right direction (Y-axis direction). One screw shaft 50A is engaged with the nut 52A attached to one sheet processing unit 46A. The other screw shaft 50B engages with the nut 52B attached to the other sheet processing unit 46B.

A driven gear 54A is attached to one end (left end) of one screw shaft 50A. A driven gear 54B is attached to one end (right end) of the other screw shaft 50B.

As illustrated in FIG. 1, the driven gears 54A and 54B of the screw shafts 50A and 50B are engaged with drive gears 58A and 58B of drive motors 56A and 56B provided in the casing 12. Note that the drive motor 56A and the drive gear 58A are not illustrated in FIG. 1.

Figure 6:
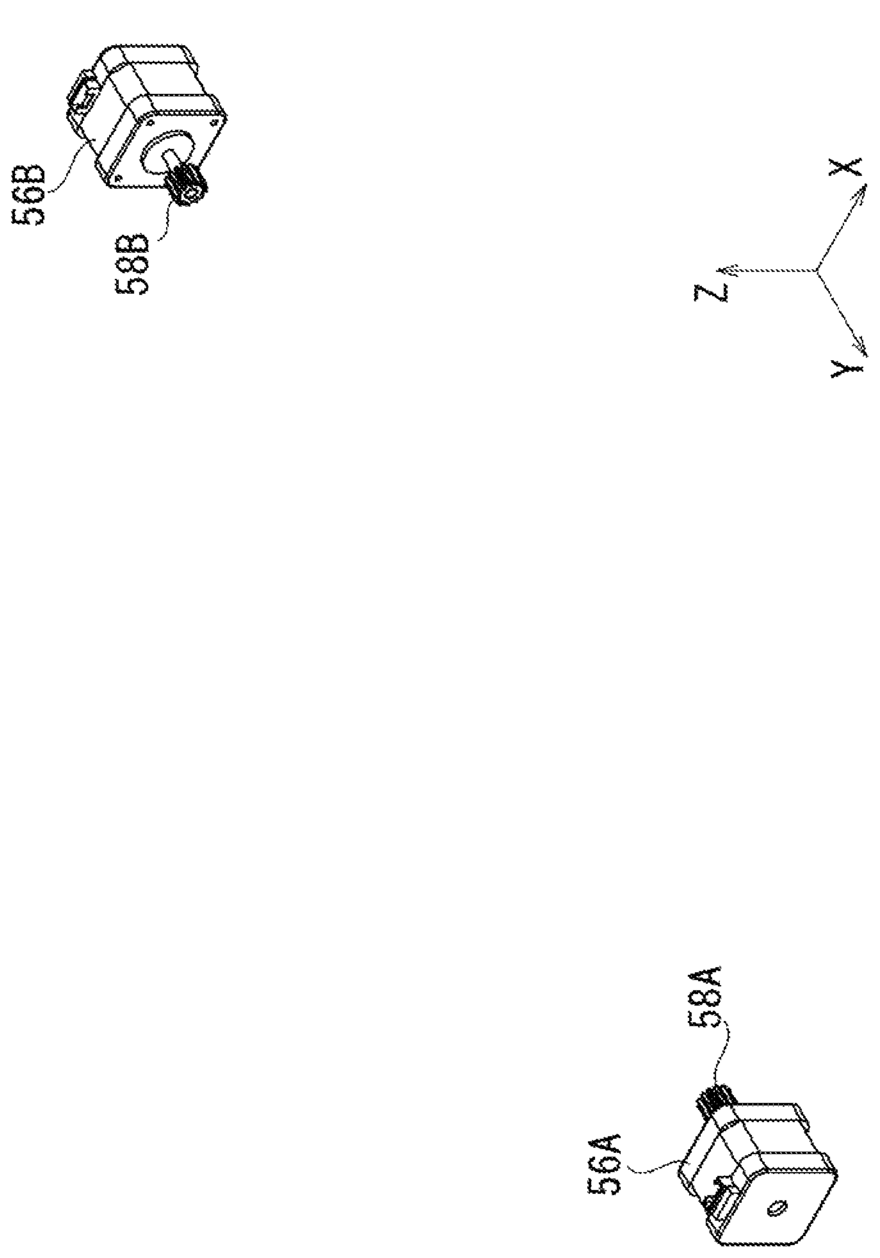
FIG. 6 is a perspective view illustrating a plurality of drive motors.

FIG. 6 is a perspective view of a plurality of drive motors.

Specifically, as illustrated in FIG. 6, the drive motor 56A and its drive gear 58A are provided in the casing 12 so as to face the drive motor 56B and its drive gear 58B in the left-right direction (Y-axis direction). The drive motors 56A and 56B facing each other are provided for each of the mounting positions P1 to P4 of the sheet processing module 30. When the sheet processing module 30 is installed at any of the mounting positions P1 to P4 of the casing 12, the driven gear 54A of the screw shaft 50A and the drive gear 58A of the drive motor 56A are engaged, and the driven gear 54B of the screw shaft 50B and the drive gear 58B of the drive motor 56B are engaged. When these drive motors 56A and 56B rotate, the sheet processing units 46A and 46B move in the left-right direction via the screw shafts 50A and 50B of the ball screw mechanism.

Each of the sheet processing units 46A and 46B includes a processing tool for processing the sheet S.

Figure 7:
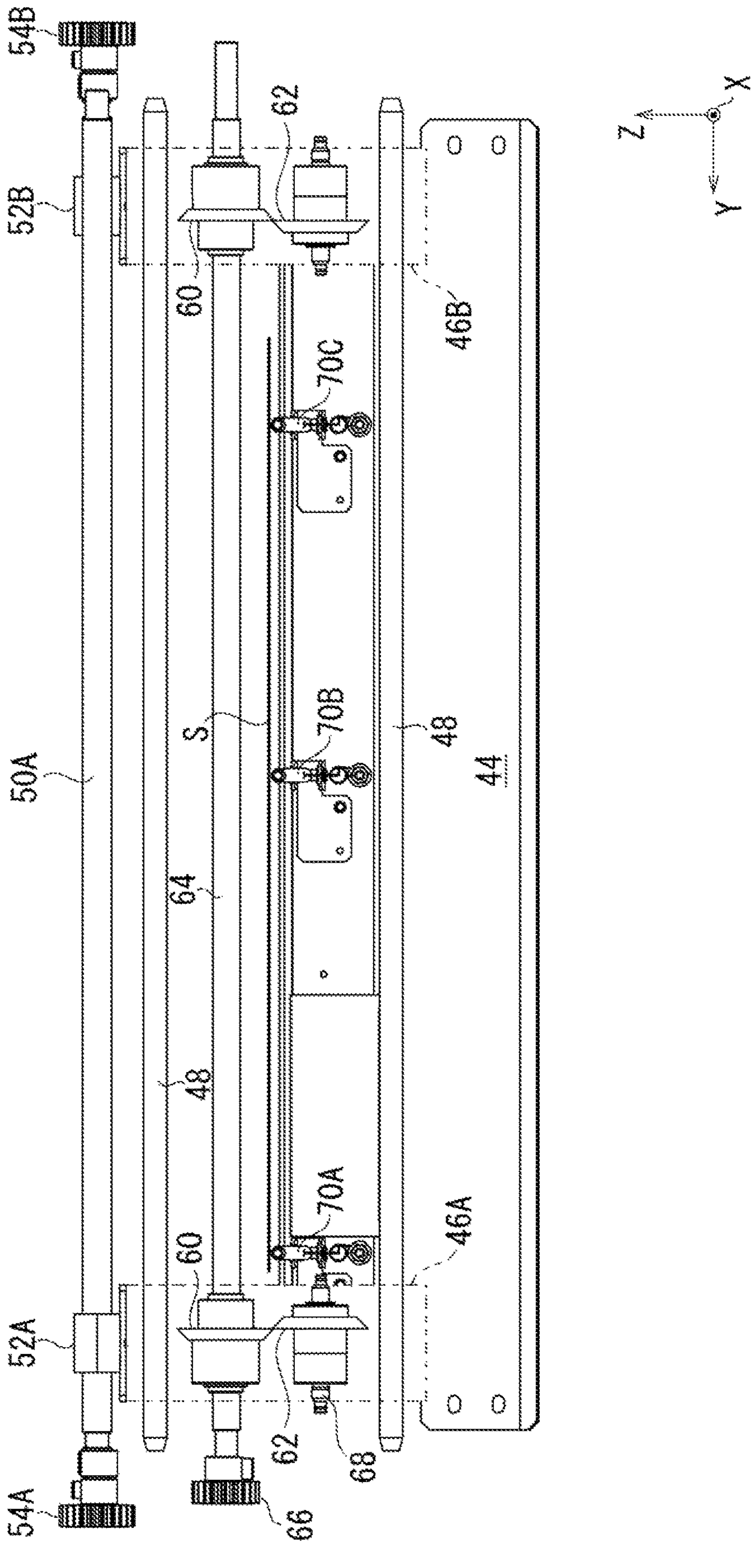
FIG. 7 is a front view illustrating a configuration inside a sheet processing unit.

FIG. 7 is a front view illustrating components in the sheet processing unit.

The sheet processing units 46A and 46B have bilaterally symmetrical (X-Z plane symmetrical) structures, and each includes therein processing tools 60 and 62 for processing the sheet S. In the case of the present embodiment, each of the processing tools 60 and 62 is a rotary cutting blade, includes a circular cutting edge as viewed in the left-right direction (as viewed in Y-axis direction), and cuts the sheet S in the conveyance direction F (X-axis direction) with the cutting edge.

One processing tool 60 of each of the sheet processing units 46A and 46B is supported by a drive shaft 64 extending in the left-right direction (Y-axis direction) so as to be non-rotatable and movable in the left-right direction. A driven gear 66 is attached to the tip end of the drive shaft 64. The driven gear 66 is engaged with any one of the drive gears 26A to 26D of the sheet conveyance units 14B and 14C. When the conveyance motors 16B and 16C of the sheet conveyance units 14B and 14C rotate, the drive shaft 64 rotates, and as a result, the processing tool 60 rotates.

The other processing tool 62 of each of the sheet processing units 46A and 46B is freely rotatably supported by a support shaft 68 provided in each of the sheet processing units 46A and 46B.

Further, as illustrated in FIGS. 4 and 5, the sheet processing module 30 includes a plurality of guide members 70A to 70C that support the sheet S passing through the sheet processing module 30.

Figure 8:
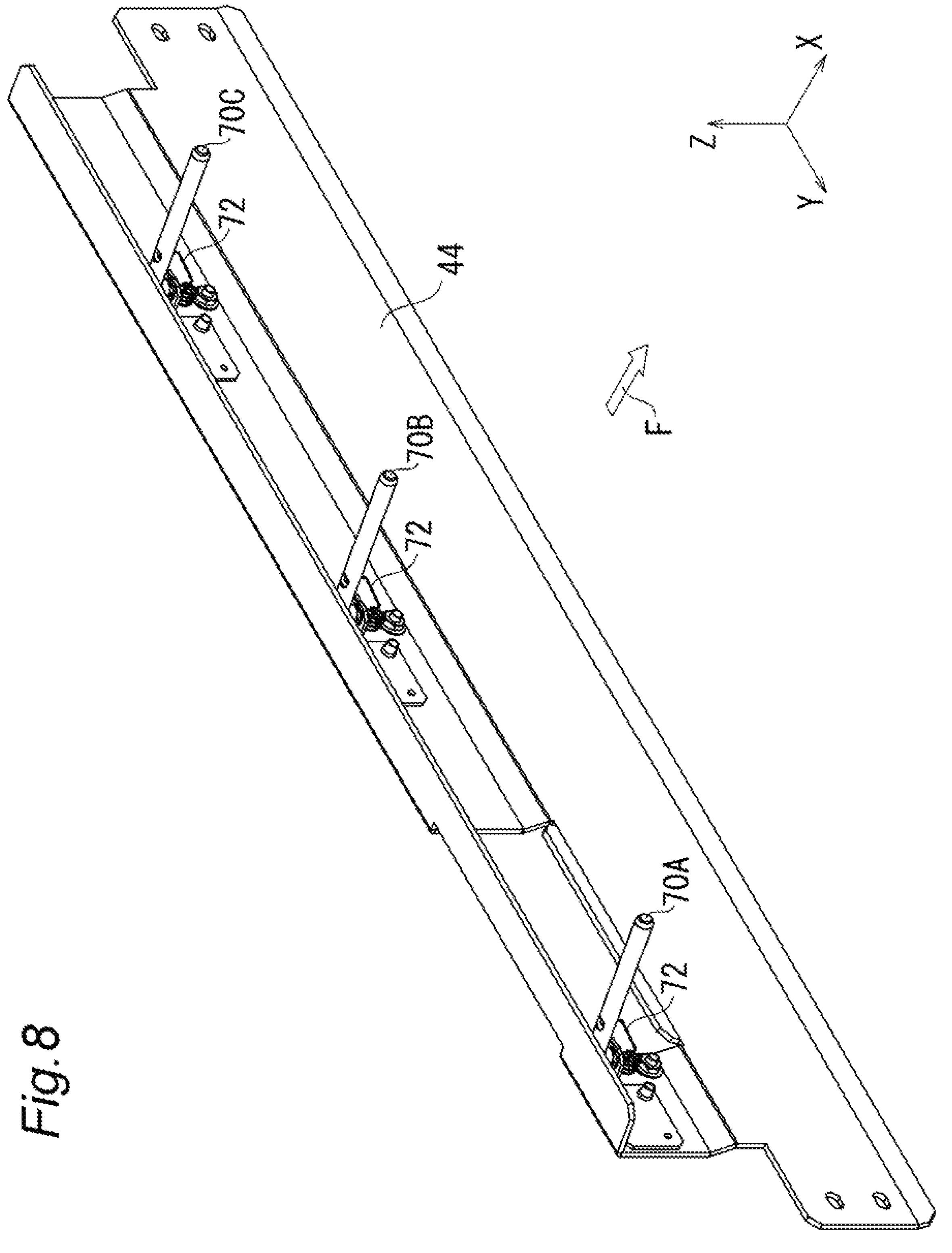
FIG. 8 is a perspective view illustrating a plurality of guide members.
Figure 9:
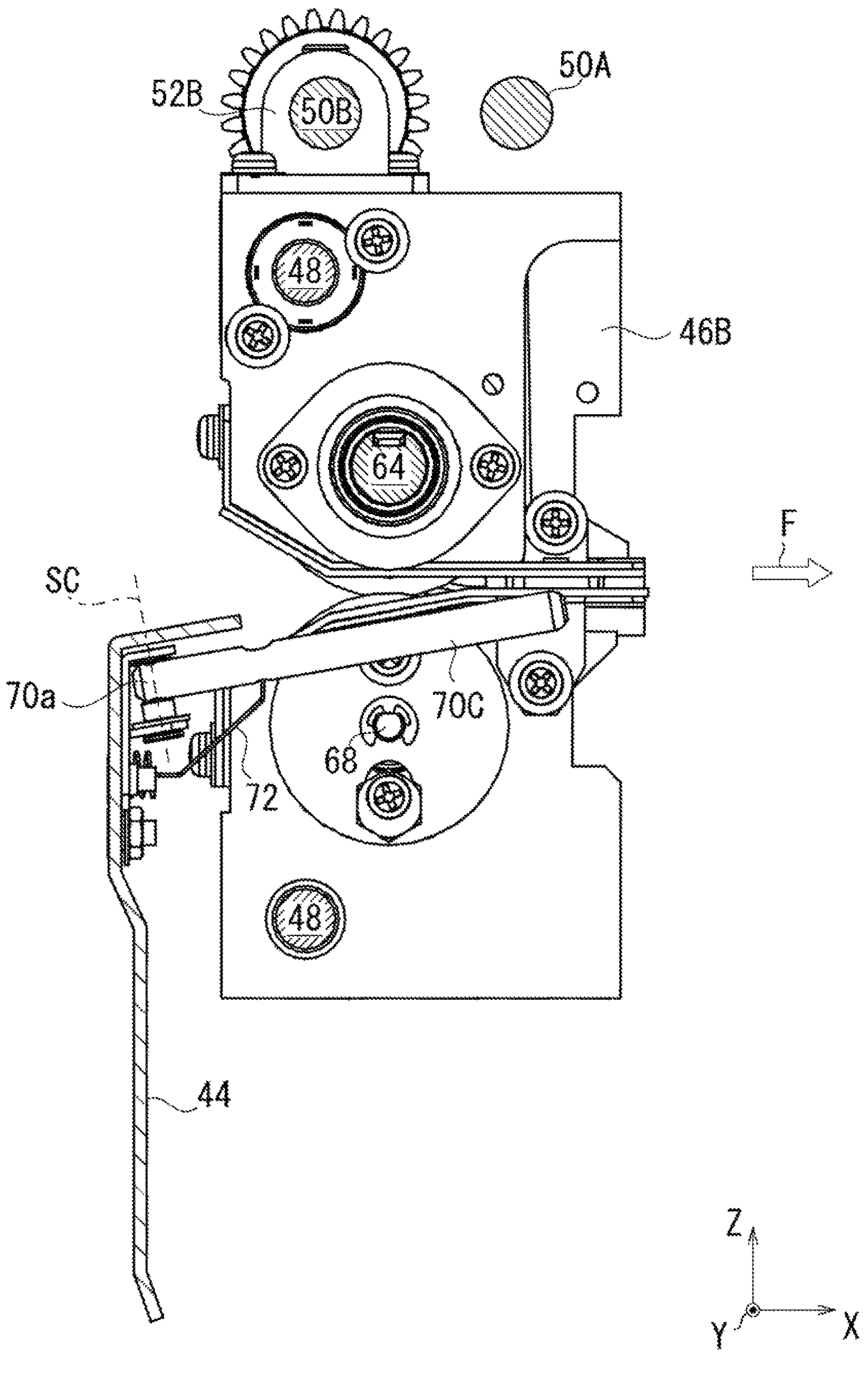
FIG. 9 is a cross-sectional view illustrating a side surface of the guide member.
Figure 10:
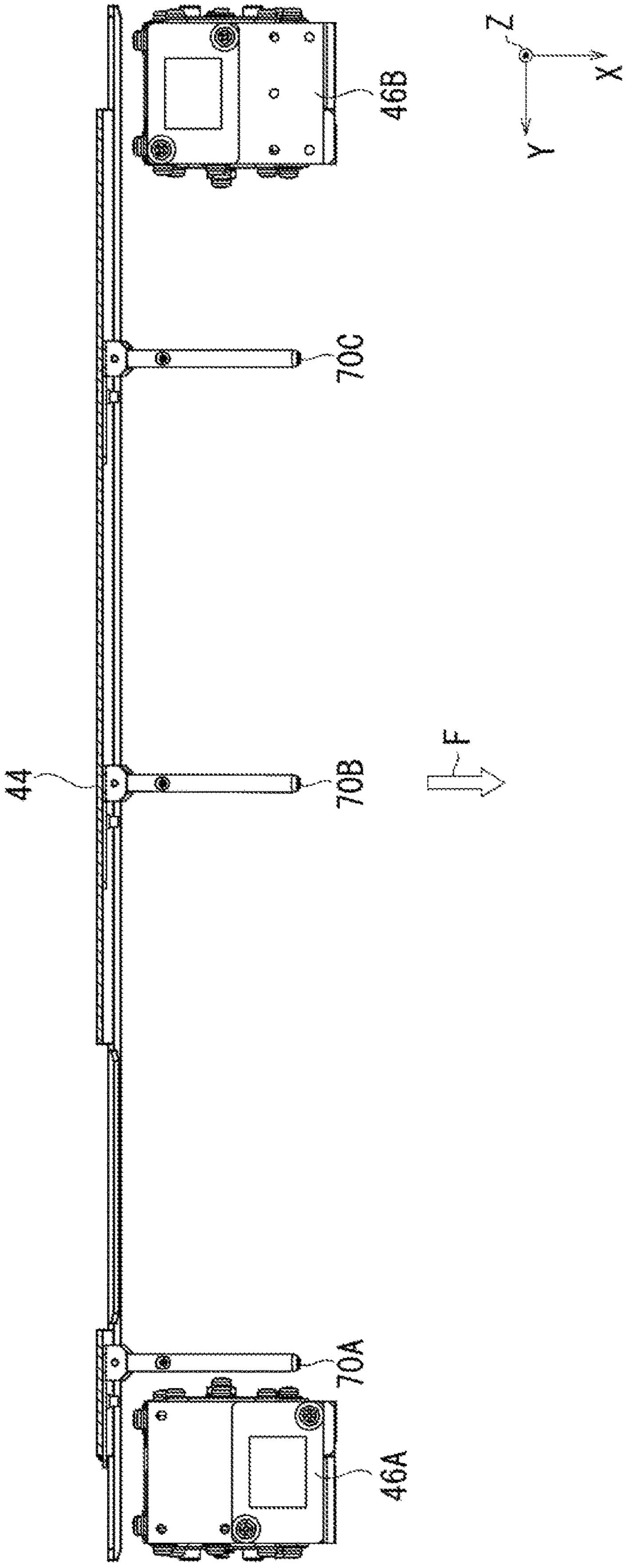
FIG. 10 is a top view illustrating a plurality of guide members.

FIG. 8 is a perspective view illustrating the plurality of guide members. FIG. 9 is a cross-sectional view illustrating a side surface of the guide member. Then, FIG. 10 is a top view illustrating the plurality of guide members.

The sheet processing module 30 does not include rollers that support the sheet S from below, such as the sheet conveyance rollers 18A to 18D of the sheet conveyance units 14A to 14D. Instead, the sheet processing module 30 includes the plurality of guide members 70A to 70C.

In the present embodiment, the plurality of guide members 70A to 70C are rod-shaped members, and extend in the conveyance direction F (X-axis direction) of the sheet S in plan view (view in Z-axis direction) of the sheet S. Note that the guide member 70A is located on the rightmost side, and the guide member 70C is located on the leftmost side.

As illustrated in FIG. 9, each of the plurality of guide members 70A to 70C includes a fixed end 70*a* at least rotatable about a rotation center line SC extending in the vertical direction. That is, each of the guide members 70A to 70C is attached to the lower back cover 44 so as to be rotatable about the rotation center line SC. Note that the plurality of guide members 70A to 70C are spaced apart so as not to come into contact with each other even when rotating.

The plurality of guide members 70A to 70C are rotatable because a part of each of the guide members 70A to 70C exists on the movement path of the sheet processing units 46A and 46B as illustrated in FIGS. 9 and 10.

Specifically, as described above, the sheet processing units 46A and 46B move along one common movement path in the left-right direction (Y-axis direction). A part of the plurality of guide members 70A to 70C enters a space through which the sheet processing units 46A and 46B pass. Accordingly, as illustrated in FIG. 10, when one sheet processing unit 46A is located at the leftmost position (retracted position) and the other sheet processing unit 46B is located at the rightmost position (retracted position), a part of each of the plurality of guide members 70A to 70C is located between the two sheet processing units 46A and 46B.

When the guide members 70A to 70C come into contact with one of the sheet processing units 46A and 46B moving in the left-right direction (Y-axis direction), the guide members are pushed by the sheet processing unit and rotate about the rotation center line SC. Finally, the guide members 70A to 70C are pushed by the sheet processing unit to rotate to the outside of the movement path of the sheet processing unit. As a result, damage in the guide members 70A to 70C due to contact with the sheet processing unit is curbed, and the sheet processing unit can pass through the guide members 70A to 70C in the left-right direction. Note that in order to enable such rotation of the guide members 70A to 70C, the fixed ends 70*a* of the guide members 70A to 70C are disposed at positions out of the movement path of the sheet processing unit. Each of the guide members 70A to 70C is biased by a biasing member 72 such as a spring, so that the guide members 70A to 70C rotated by being pushed by the sheet processing unit return to an original orientation illustrated in FIGS. 8 and 10 where they can support the sheet S, that is, an original orientation where a part of the guide members 70A to 70C is located on the movement path of the sheet processing unit.

Hereinabove, the configuration of the sheet processing apparatus 10 according to the present embodiment has been described. Hereinafter, the operation of the sheet processing apparatus 10 and control regarding the operation will be described.

Figure 11:
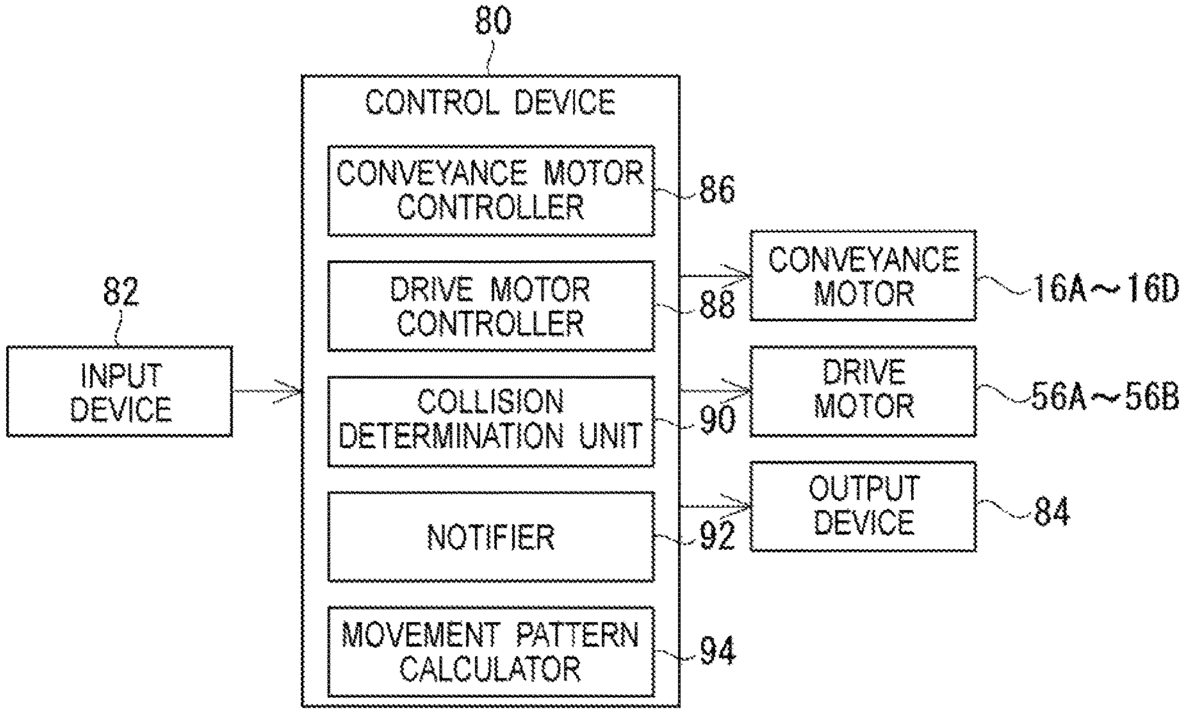
FIG. 11 is a block diagram illustrating a control system of the sheet processing apparatus.

FIG. 11 is a block diagram illustrating a control system of the sheet processing apparatus. Note that FIG. 11 illustrates only components necessary for control closely related to the embodiment of the present disclosure.

As illustrated in FIG. 11, the sheet processing apparatus 10 includes a control device 80 that controls a plurality of components, an input device 82, and an output device 84. The input device 82 is a device for acquiring information (sheet processing job information) such as a sheet processing condition from an operator or an external device. The input device 82 is, for example, a mouse, a keyboard, or a touch screen as a user interface, a communication device for communicating with an external device, or the like. The output device 84 is a device for outputting information such as a result of sheet processing to an operator or an external device. The output device 84 is, for example, a display or a speaker as a user interface, a communication device for communicating with an external device, or the like.

The control device 80 includes a conveyance motor controller 86, a drive motor controller 88, a collision determination unit 90, and a notifier 92. In the case of the present embodiment, the control device 80 also includes a movement pattern calculator 94.

The control device 80 includes, for example, a processor such as a CPU and a storage device such as an HDD. According to a program stored in the storage device, the processor operates as the conveyance motor controller 86, the drive motor controller 88, the collision determination unit 90, the notifier 92, or the movement pattern calculator 94.

The conveyance motor controller 86 of the control device 80 controls the conveyance motors 16A to 16D in the plurality of sheet conveyance units 14A to 14D. That is, the conveyance motor controller 86 controls the sheet conveying speed of each of the plurality of sheet conveyance units 14A to 14D.

For example, in the plurality of sheet conveyance units 14A to 14D, the conveyance motor controller 86 synchronizes the sheet conveyance speeds of two adjacent sheet conveyance units at a predetermined speed.

There is a case where the sheet conveying speed of any of the plurality of sheet conveyance units 14A to 14D fluctuates from a predetermined speed. Examples include a case where the sheet processing units 46A and 46B process the stopped sheet S, and a case where the sheet S is re-fed due to a sheet feeding error.

For example, in two adjacent sheet conveyance units, when the sheet conveyance speed of the sheet conveyance unit on the downstream side is a predetermined speed and higher than that of the sheet conveyance unit on the upstream side, and the sheet conveyance unit on the upstream side is accelerating, the conveyance motor controller 86 decelerates the sheet conveyance speed of the sheet conveyance unit on the downstream side from the predetermined speed. Then, when the sheet conveyance speeds of both sheet conveyance units become the same, from that timing, the two are synchronized and accelerated to the predetermined speed.

For example, in two adjacent sheet conveyance units, when the sheet conveyance speed of the sheet conveyance unit on the upstream side is a predetermined speed and higher than that of the sheet conveyance unit on the downstream side, and the sheet conveyance unit on the downstream side is accelerating, the conveyance motor controller 86 decelerates the sheet conveyance speed of the sheet conveyance unit on the upstream side from the predetermined speed. Then, when the sheet conveyance speeds of both sheet conveyance units become the same, from that timing, the two are synchronized and accelerated to the predetermined speed.

Further, for example, in two adjacent sheet conveyance units, when the sheet conveyance speed of the sheet conveyance unit on the upstream side is a predetermined speed and higher than that of the sheet conveyance unit on the downstream side, and the sheet conveyance unit on the downstream side is decelerating or stopped, the conveyance motor controller 86 decelerates or stops the sheet conveyance unit on the upstream side.

That is, in the two adjacent sheet conveyance units, the conveyance motor controller 86 temporarily decelerates the sheet conveyance unit having a higher sheet conveyance speed and adjusts the sheet conveyance speed to the sheet conveyance speed of the slower sheet conveyance unit. Then, when the sheet conveyance speeds of both sheet conveyance units become the same, from that timing, the two are synchronized and accelerated to the predetermined speed. By such synchronization control, the sheet S is smoothly transferred between two adjacent sheet conveyance units.

The drive motor controller 88 of the control device 80 controls the drive motors 56A and 56B to control the positions of the sheet processing units 46A and 46B in the left-right direction (Y-axis direction) in the sheet processing module 30. For example, the drive motor controller 88 controls the positions of the sheet processing units 46A and 46B based on a sheet processing position included in sheet processing job information acquired via the input device 82.

The collision determination unit 90 of the control device 80 executes determination processing of determining whether or not there is a possibility of occurrence of collision in which the guide members 70A to 70C may be damaged by movement of the plurality of sheet processing units 46A and 46B. Specifically, the collision determination unit 90 determines whether or not there is a possibility of occurrence of collision of the guide member, which is rotated by being pushed by one of the plurality of sheet processing units 46A and 46B, with the other sheet processing unit. When such a collision occurs, at least one of the guide member and the collided sheet processing unit may be damaged.

Figure 12A:
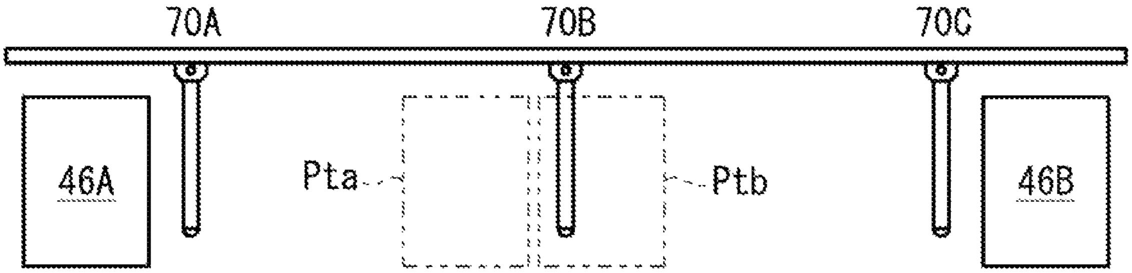
FIG. 12A is a diagram for describing Case 1 in which there is a possibility that collision of a rotated guide member may occur.
Figure 12B:
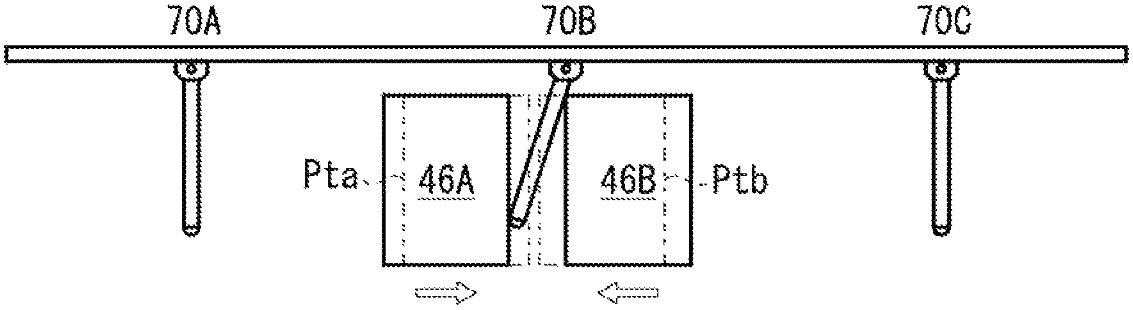
FIG. 12B is a diagram illustrating a state in which collision of the rotated guide member has occurred in Case 1.

FIG. 12A is a diagram for describing Case 1 in which there is a possibility that collision of a rotated guide member may occur. FIG. 12B is a diagram illustrating a state in which collision of the rotated guide member has occurred in Case 1.

As illustrated in FIG. 12A, in Case 1, the sheet processing units 46A and 46B on standby at the retracted positions on both sides move toward target positions Pta and Ptb located at the center. As illustrated in FIG. 12B, when the sheet processing units 46A and 46B move toward the respective target positions Pta and Ptb, the guide member 70B brought into contact with the sheet processing unit 46B rotates and collides with the sheet processing unit 46A.

Figure 13A:
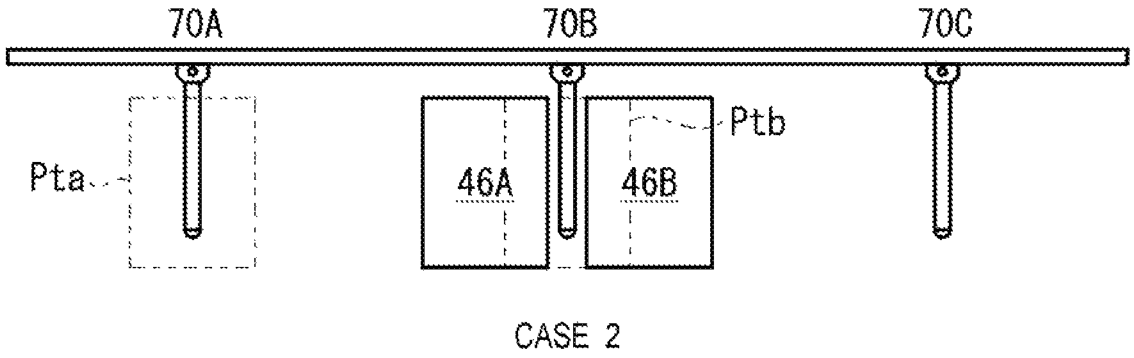
FIG. 13A is a diagram for describing Case 2 in which there is a possibility that collision of a rotated guide member may occur.
Figure 13B:
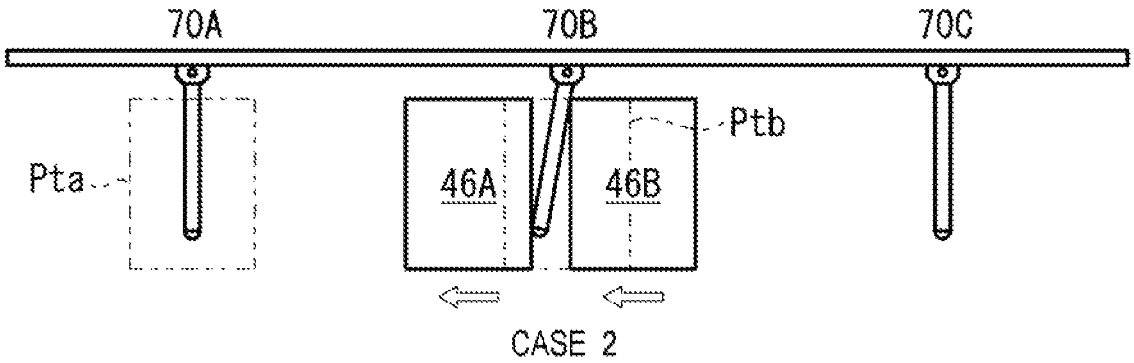
FIG. 13B is a diagram illustrating a state in which collision of the rotated guide member has occurred in Case 2.

FIG. 13A is a diagram for describing Case 2 in which there is a possibility that collision of a rotated guide member may occur. FIG. 13B is a diagram illustrating a state in which collision of the rotated guide member has occurred in Case 2.

As illustrated in FIG. 13A, in Case 2, the sheet processing unit 46A on standby on one side of the guide member 70B moves to the left toward the target position Pta in contact with the guide member 70A. The sheet processing unit 46B on standby on the other side of the guide member 70B moves to the left toward the target position Ptb in contact with the guide member 70B. As illustrated in FIG. 13B, when the sheet processing units 46A and 46B move to the left toward the respective target positions Pta and Ptb, the guide member 70B brought into contact with the sheet processing unit 46B rotates and collides with the sheet processing unit 46A.

Figure 14A:
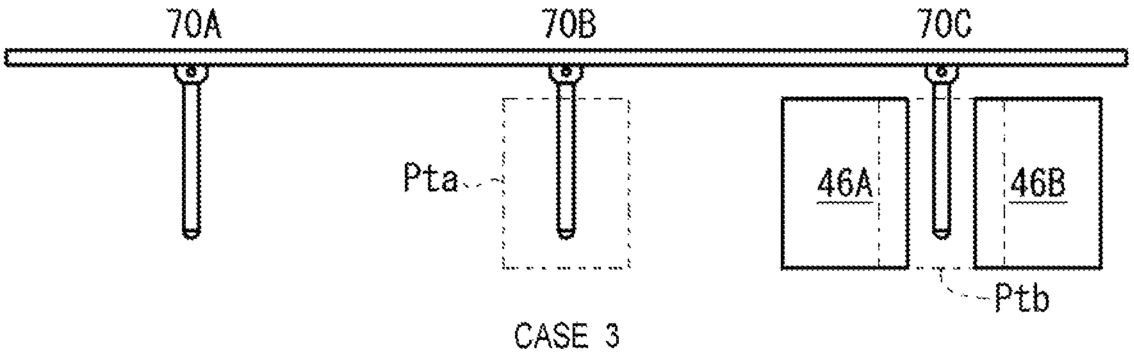
FIG. 14A is a diagram for describing Case 3 in which there is a possibility collision of a rotated guide member may occur.
Figure 14B:
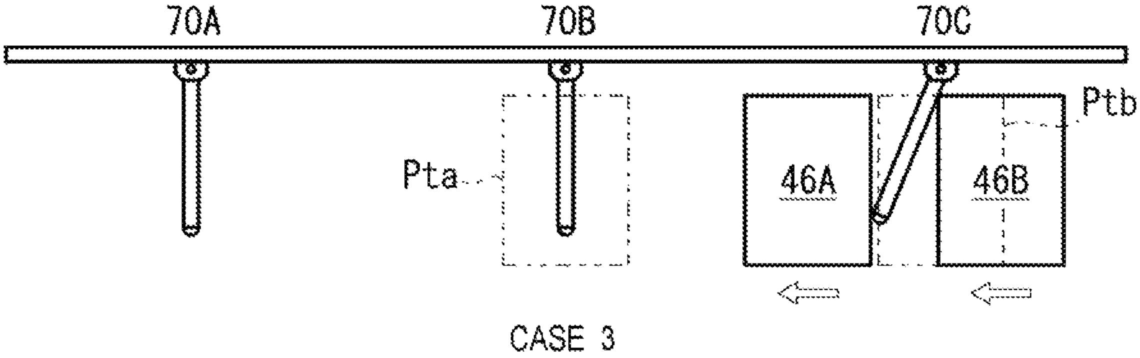
FIG. 14B is a diagram illustrating a state in which collision of the rotated guide member has occurred in Case 3.

FIG. 14A is a diagram for describing Case 3 in which there is a possibility that collision of a rotated guide member may occur. FIG. 14B is a diagram illustrating a state in which collision of the rotated guide member has is occurred in Case 3.

As illustrated in FIG. 14A, in Case 3, the sheet processing unit 46A on standby on one side of the guide member 70C moves to the left toward the target position Pta in contact with the guide member 70B. The sheet processing unit 46B on standby on the other side of the guide member 70C moves to the left toward the target position Ptb in contact with the guide member 70C. As illustrated in FIG. 14B, when the sheet processing units 46A and 46B move to the left toward the respective target positions Pta and Ptb, the guide member 70C brought into contact with the sheet processing unit 46B rotates and collides with the sheet processing unit 46A.

The collision determination unit 90 determines whether or not there is a possibility of occurrence of such collision between a rotated guide member and a sheet processing unit based on a predetermined collision determination flow.

Figure 15A:
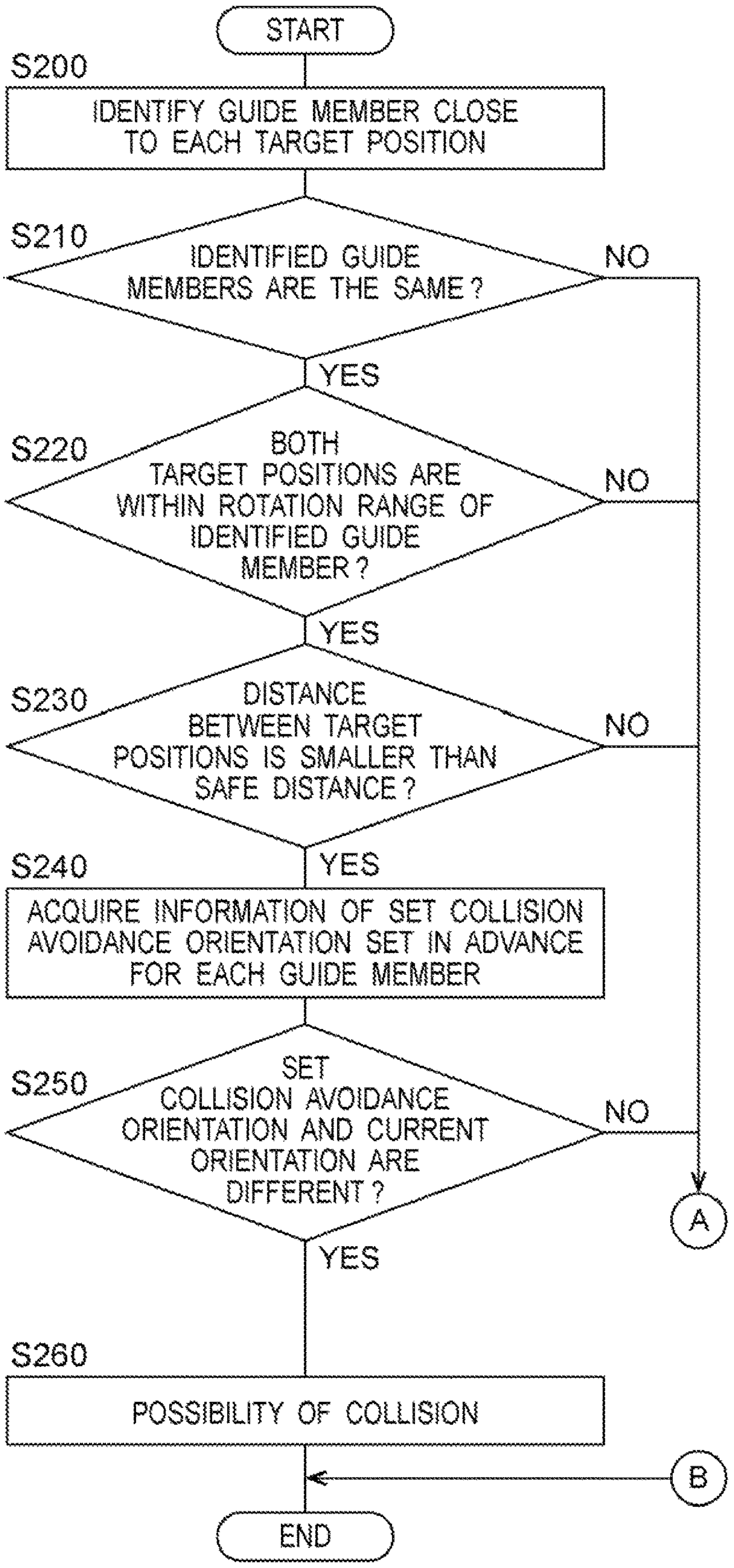
FIG. 15A is a flowchart illustrating a collision determination flow for determining whether or not there is a possibility of occurrence of collision of a rotated guide member.
Figure 15B:
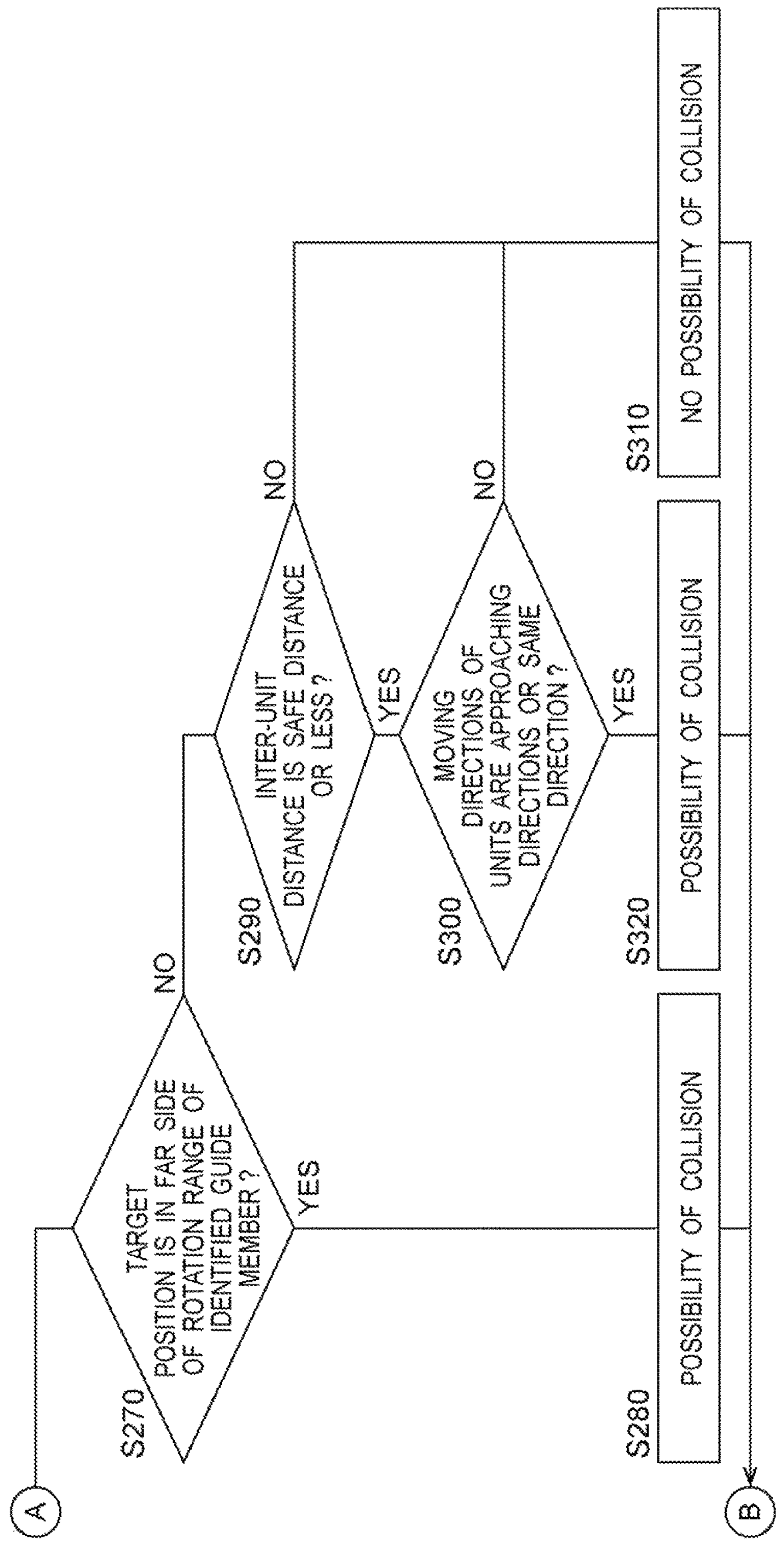
FIG. 15B is a flowchart illustrating a collision determination flow for determining whether or not there is a possibility of occurrence of collision of a rotated guide member.

FIGS. 15A and 15B are flowcharts illustrating a collision determination flow for determining whether or not there is a possibility of occurrence of collision of a rotated guide member.

First, parameters necessary for determining whether or not there is a possibility of occurrence of collision between a rotated guide member and a sheet processing unit will be described.

Figure 16A:
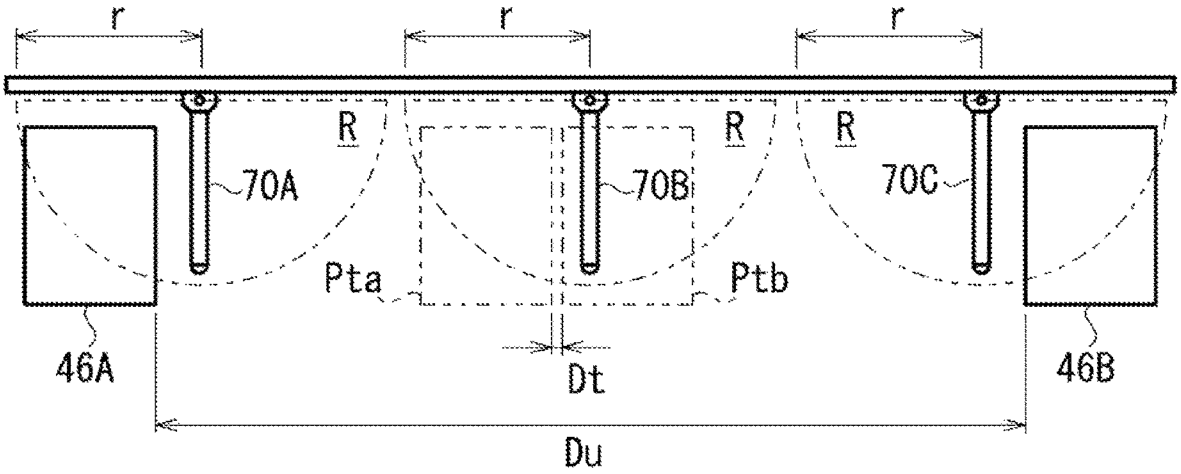
FIG. 16A is a diagram illustrating parameters necessary for determining whether or not there is a possibility of occurrence of collision of a rotated guide member.
Figure 16B:
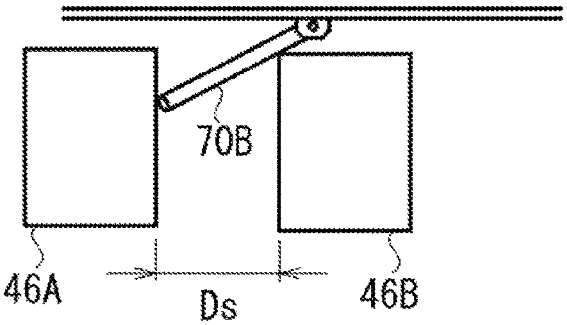
FIG. 16B is a diagram for describing a safe distance between sheet processing units.

FIG. 16A is a diagram illustrating parameters necessary for determining whether or not there is a possibility of occurrence of collision of a rotated guide member. FIG. 16B is a diagram for describing a safe distance between sheet processing units.

As illustrated in FIG. 16A, a rotation range R is set for each of the guide members 70A to 70C as a parameter necessary for collision determination. The sheet processing units 46A and 46B located outside the rotation range R do not come into contact with the guide member for which the rotation range is set. Note that the rotation range R is a semicircular region defined by a radius r slightly larger than the size (length) of the guide member from the rotation center to the tip end (free end).

As illustrated in FIG. 16A, a distance Dt between the target position Pta of the sheet processing unit 46A and the target position Ptb of the sheet processing unit 46B is used as a parameter necessary for collision determination. Further, a distance Du between the sheet processing units 46A and 46B before starting the movement (at present) is also used as a parameter necessary for collision determination.

As illustrated in FIG. 16B, a safe distance Ds is a distance between the two sheet processing units 46A and 46B, and is a distance necessary for avoiding damage in the guide members 70A to 70C. The safe distance Ds is a distance between sheet processing units at which, even when one sheet processing unit comes into contact and rotates a guide member, the guide member does not collide with the other sheet processing unit. More specifically, the safe distance Ds is a distance between sheet processing units at which, when one sheet processing unit is located at a position where a guide member is maximally rotated from the original orientation, the other sheet processing unit does not come into contact with the guide member.

Before executing the determination flow illustrated in FIGS. 15A and 15B, the collision determination unit 90 acquires the current positions of the sheet processing units 46A and 46B. The current position can be acquired from, for example, history data of movement of the sheet processing units 46A and 46B, rotation angles of the drive motors 56A and 56B (e.g., detection values of rotary encoders), a detection value of a position detection sensor that detects the position of the sheet processing unit, and the like. The collision determination unit 90 also acquires the target positions Pta and Ptb based on sheet processing position information included in sheet processing job information acquired via the input device 82.

In the case of the present embodiment, the collision determination unit 90 executes the determination processing on the precondition (first precondition) that the sheet processing units 46A and 46B simultaneously start to move toward the respective target positions Pta and Ptb. Further, in the case of the present embodiment, the collision determination unit 90 executes the determination processing on the precondition (second precondition) that the sheet processing units 46A and 46B move toward the respective target positions Pta and Ptb at the same speed.

As illustrated in FIG. 15A, in step S200 of the collision determination flow, the collision determination unit 90 identifies a guide member close to the target position Pta of the sheet processing unit 46A and a guide member close to the target position Ptb of the sheet processing unit 46B. In Case 1 illustrated in FIG. 12A, the guide member 70B is identified as the guide member close to the target position Pta, and the guide member 70B is identified as the guide member close to the target position Ptb.

In subsequent step S210, the collision determination unit 90 determines whether or not the guide members identified in step S200 are the same. Case 1 illustrated in FIG. 12A is a case where the identified guide members are the same. If the identified guide members are the same, the processing proceeds to step S220. If not, the processing proceeds to step S270.

In step S220, the collision determination unit 90 determines whether or not both the target positions Pta and Ptb exist within the rotation range R of the guide member identified to be the same in step S210. In Case 1 illustrated in FIG. 12A, both the target positions Pta and Ptb exist within the rotation range R of the guide member 70B. If both the target positions Pta and Ptb are within the rotation range R of the identified guide member, the processing proceeds to step S230. If not, the processing proceeds to step S270.

In step S230, the collision determination unit 90 determines whether or not the distance Dt between the target positions Pta and Ptb is smaller than the safe distance Ds. Case 1 illustrated in FIG. 12A is a case where the distance Dt between the target positions Pta and Ptb is smaller than the safe distance Ds. If the distance Dt is smaller than the safe distance Ds, the processing proceeds to step S240. If not, the processing proceeds to step S270.

In step S240, the collision determination unit 90 acquires information of set collision avoidance orientation set in advance for each of the guide members 70A to 70C. Information of set collision avoidance orientation is information on a preset orientation that a guide member should take, when a sheet processing unit is within the rotation range of the guide member, to avoid collision with the other sheet processing unit. Information of set collision avoidance orientation is stored in a storage device of the control device 80.

In subsequent step S250, the collision determination unit 90 calculates the set collision avoidance orientation when the sheet processing units 46A and 46B are located at the target positions Pta and Ptb based on the information of the set collision avoidance orientation acquired in step S240. Then, the collision determination unit 90 determines whether or not the set collision avoidance orientation calculated for the guide member identified to be the same in step S210 is different from the current orientation of the guide member. Note that the case of a "different orientation" here refers to a case where one of the calculated set collision avoidance orientation and the current orientation is the original orientation and the other is an orientation rotated to the left side or the right side, and a case where one of the calculated set collision avoidance orientation and the current orientation is an orientation rotated to the left side and the other is an orientation rotated to the right side. If the orientation is different, the processing proceeds to step S260, and the collision determination unit 90 determines that there is a possibility of occurrence of a collision between the guide member and the sheet processing unit that may damage the guide member. If not, the processing proceeds to step S270.

In step S270, the collision determination unit 90 determines whether or not at least one of the target position Pta of the sheet processing unit 46A and the target position Ptb of the sheet processing unit 46B is located in a region on the far side of the rotation range R of the guide member identified to be the same in step S210. When the guide member is in the original orientation, its rotation range R is divided into a right region and a left region by the guide member. When the sheet processing unit exists on the right side of the guide member, the left side region of the rotation range R of the guide member is the far side region with respect to the sheet processing unit. When the sheet processing unit exists on the left side of the guide member, the right side region of the rotation range R of the guide member is the far side region with respect to the sheet processing unit. If at least one of the target positions Pta and Ptb is located in the region on the far side of the rotation range R of the identified guide member, the processing proceeds to step S280, and the collision determination unit 90 determines that there is a possibility of occurrence of collision between the rotated guide member and the sheet processing unit. If not, the processing proceeds to step S290.

In step S290, the collision determination unit 90 determines whether or not the current distance Du between the sheet processing units 46A and 46B is smaller than the safe distance Ds. If the distance Du is smaller than the safe distance Ds, the processing proceeds to step S300. If not, the processing proceeds to step S310, and the collision determination unit 90 determines that there is no possibility of occurrence of collision.

In step S300, the collision determination unit 90 determines whether or not the movement directions when the sheet processing units 46A and 46B respectively move toward the target positions Pta and Ptb are directions in which the sheet processing units 46A and 46B approach each other or are the same direction. If the directions are approaching directions or are the same direction, the processing proceeds to step S320, and the collision determination unit 90 determines that there is a possibility of occurrence of collision between the rotated guide member and the sheet processing unit. If not, the processing proceeds to step S310.

Then, when the processing in step S260, step S280, step S310, or step S320 is completed, the collision determination unit 90 ends the determination processing according to the collision determination flow.

According to the collision determination flow illustrated in FIGS. 15A and 15B, in Cases 1 to 3 illustrated in FIGS. 12A, 13A, and 14A, it is determined that there is a possibility of occurrence of collision of the rotated guide members illustrated in FIGS. 12B, 13B, and 14B. For example, in Case 1, it is determined that the set collision avoidance orientation and the current orientation are different in the process of step S250, and it is determined that there is a possibility of collision in the process of step S260. In Cases 2 and 3, it is determined that the moving directions of the sheet processing units 46A and 46B are the same direction in the process of step S300, and it is determined that there is a possibility of collision in the process of step S320.

Note that if the collision determination unit 90 determines that there is no possibility of occurrence of collision, the drive motor controller 88 may move the sheet processing units 46A and 46B toward the target positions Pta and Ptb in accordance with the sheet processing job.

Returning to FIG. 11, the notifier 92 of the control device 80 notifies the operator of the determination result of the collision determination unit 90 via the output device 84. That is, the notifier 92 notifies the operator that there is a possibility of occurrence of collision of the guide member rotated by being pushed by one of the sheet processing units 46A and 46B with the other sheet processing unit. Note that the notifier 92 may notify the operator that there is no possibility of occurrence of collision. With this notification, the operator can review the sheet processing job, that is, the processing position of the sheet (arrangement position of sheet processing unit) before the guide member is damaged. Alternatively, the operator can change the current position of the sheet processing unit and cause the sheet processing apparatus 10 to execute the sheet processing job without changing the sheet processing job.

Note that the notifier 92 may notify the operator of a guide member that may cause a collision via the output device 84 based on the determination result of the collision determination unit 90. With this notification, the operator can easily review the sheet processing job. In a case where the position of the guide member can be changed or the guide member can be attached and detached, the operator can cause the sheet processing apparatus 10 to execute the sheet processing job without changing the sheet processing job by changing the position in the left-right direction (Y-axis direction) of the guide member that may cause a collision or removing the guide member from the lower back cover 44.

The notifier 92 may give notification of a collision avoidance method based on the determination result of the collision determination unit 90. For example, the notifier 92 may notice the operator by giving an instruction to change a sheet processing job, an instruction to change the processing tools 60 and 62 of the sheet processing units 46A and 46B, an instruction to retract a guide member that may cause a collision (instruction to fix a guide member in a state of rotating to the maximum), an instruction to remove the guide member that may cause a collision, and the like.

In the case of the present embodiment, the control device 80 includes the movement pattern calculator 94 that calculates a movement pattern of the sheet processing units 46A and 46B that avoids collision of the guide member pushed and rotated by one of the sheet processing units 46A and 46B with the other sheet processing unit.

The movement pattern calculator 94 simulates various movement patterns based on a movement start position and a target position of each of the sheet processing units 46A and 46B. For example, when the current inter-unit distance Du between the sheet processing units 46A and 46B is smaller than the safe distance Ds, a movement pattern is calculated to move one of the sheet processing units 46A and 46B and increase the inter-unit distance Du to the safe distance Ds or more. For this calculation, for example, the movement pattern calculator 94 simulates movement patterns on condition that movement start timings of the sheet processing units 46A and 46B are different.

Additionally, for example, the movement pattern calculator 94 simulates movement patterns on condition that when one of the sheet processing units 46A and 46B approaches the other and changes direction after approaching, and the inter-unit distance Du reaches the safe distance Ds or more, the other sheet processing unit starts to move toward the target position.

FIGS. 17A to 17D are diagrams illustrating an example of a movement pattern for avoiding collision of the rotated guide member with the sheet processing unit in Case 1 illustrated in FIGS. 12A and 12B.

First, in the movement pattern in Case 1, as illustrated in FIG. 12A, the sheet processing unit 46B located on the right side of the guide member 70C starts to move toward the target position Ptb, that is, to approach the sheet processing unit 46A. At this time, the sheet processing unit 46A maintains the stopped state at the current position.

Figure 17A:
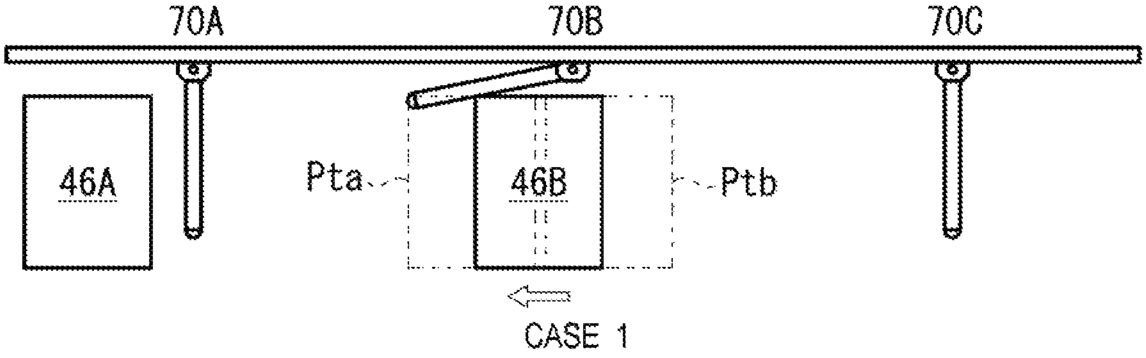
FIG. 17A is a diagram illustrating an example of a movement pattern for avoiding collision of the rotated guide member with the sheet processing unit in Case 1 illustrated in FIGS. 12A and 12B.
Figure 17B:
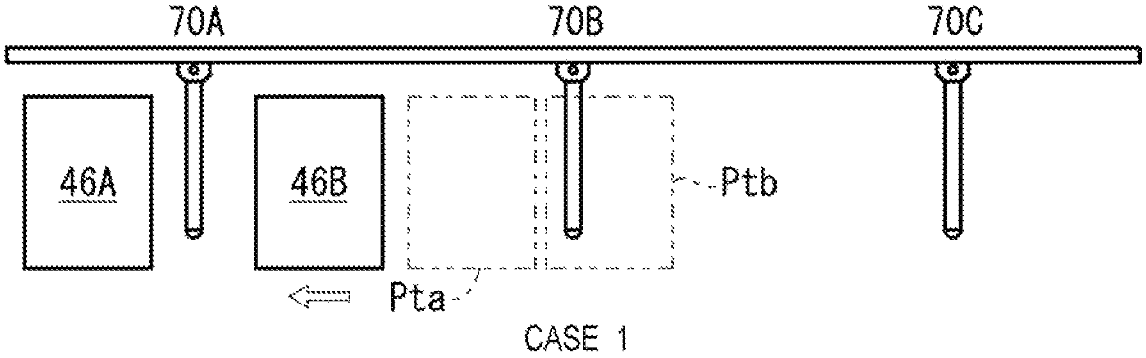
FIG. 17B is a diagram illustrating an example of a movement pattern for avoiding collision of the rotated guide member with the sheet processing unit in Case 1 illustrated in FIGS. 12A and 12B.
Figure 17C:
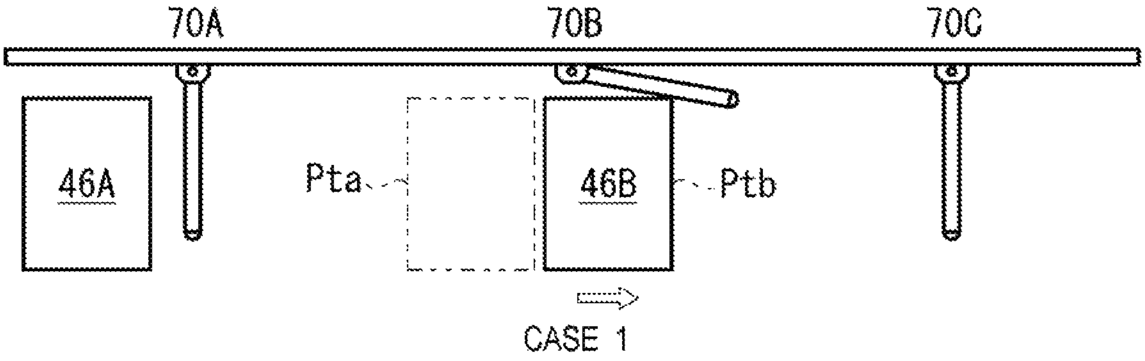
FIG. 17C is a diagram illustrating an example of a movement pattern for avoiding collision of the rotated guide member with the sheet processing unit in Case 1 illustrated in FIGS. 12A and 12B.

As illustrated in FIGS. 17A to 17C, when the sheet processing unit 46B passes through the target position Ptb and exits the rotation range R of the guide member 70B, the guide member 70B returns to the original orientation. The sheet processing unit 46B that has passed through the rotation range R of the guide member 70B changes its direction before coming into contact with the guide member 70A and moves toward the target position Ptb. As a result, the tip end of the guide member 70B is brought into the set collision avoidance orientation with respect to the sheet processing unit 46A. Then, when the sheet processing unit 46B reaches the target position Ptb or the inter-unit distance Du reaches the safe distance Ds or more, the sheet processing unit 46A starts to move toward the target position Pta.

Figure 17D:
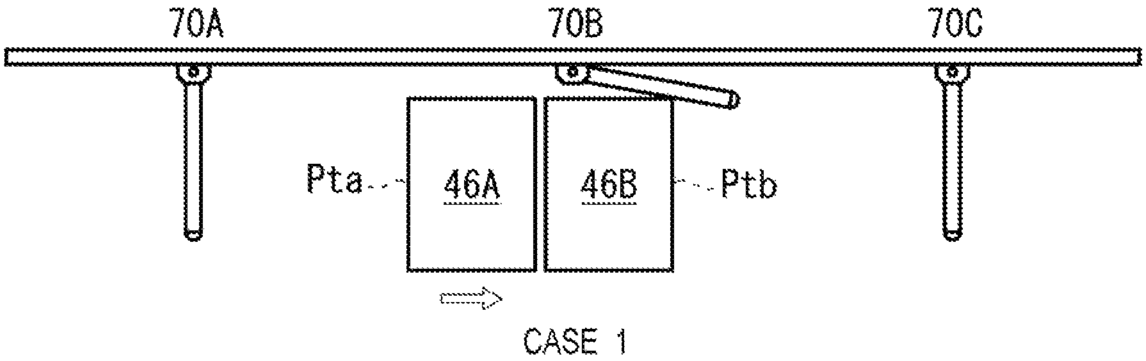
FIG. 17D is a diagram illustrating an example of a movement pattern for avoiding collision of the rotated guide member with the sheet processing unit in Case 1 illustrated in FIGS. 12A and 12B.

With such a movement pattern of the sheet processing units 46A and 46B, it is possible to avoid the collision of the guide member 70B rotated by contact with the sheet processing unit 46B with the sheet processing unit 46A illustrated in FIG. 12B. As a result, as illustrated in FIG. 17D, the sheet processing unit 46A can reach the target position Pta, and the sheet processing unit 46B can reach the target position Ptb while avoiding the collision.

Figure 18A:
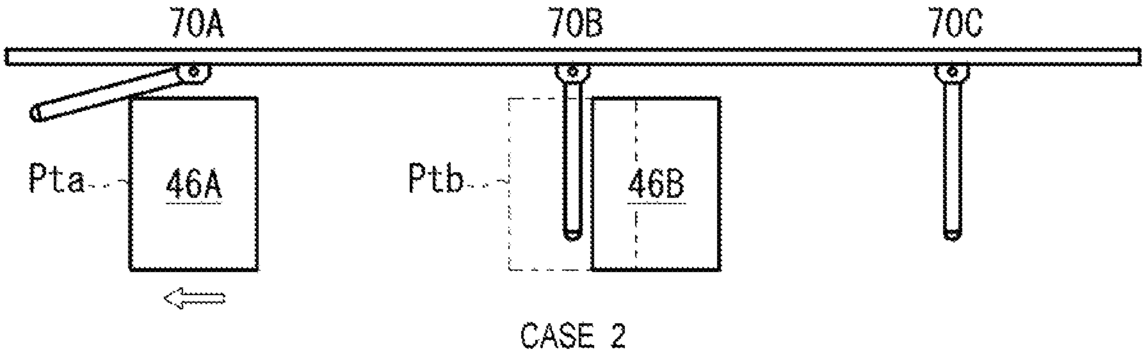
FIG. 18A is a diagram illustrating an example of a movement pattern for avoiding collision of the rotated guide member with the sheet processing unit in Case 2 illustrated in FIGS. 13A and 13B.
Figure 18B:
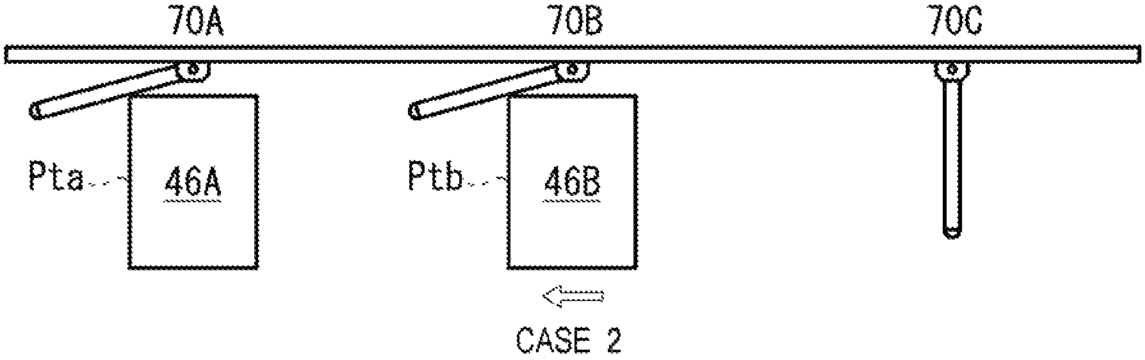
FIG. 18B is a diagram illustrating an example of a movement pattern for avoiding collision of the rotated guide member with the sheet processing unit in Case 2 illustrated in FIGS. 13A and 13B.

FIGS. 18A to 18B are diagrams illustrating an example of a movement pattern for avoiding collision of the rotated guide member with the sheet processing unit in Case 2 illustrated in FIGS. 13A and 13B.

First, in the movement pattern in Case 2, as illustrated in FIG. 18A, the sheet processing unit 46A starts to move toward the target position Pta on the left side thereof. At this time, the sheet processing unit 46B maintains the stopped state.

As illustrated in FIG. 18A, when the sheet processing unit 46A reaches the target position Pta or when the inter-unit distance Du between the sheet processing units 46A and 46B becomes larger than the safe distance Ds, the sheet processing unit 46B starts to move to the left side. As a result, as illustrated in FIG. 18B, the sheet processing unit 46A can reach the target position Pta, and the sheet processing unit 46B can reach the target position Ptb while avoiding the collision.

With such a movement pattern of the sheet processing units 46A and 46B, it is possible to avoid the collision of the guide member 70B rotated by the contact with the sheet processing unit 46B with the sheet processing unit 46A illustrated in FIG. 13B.

Figure 19A:
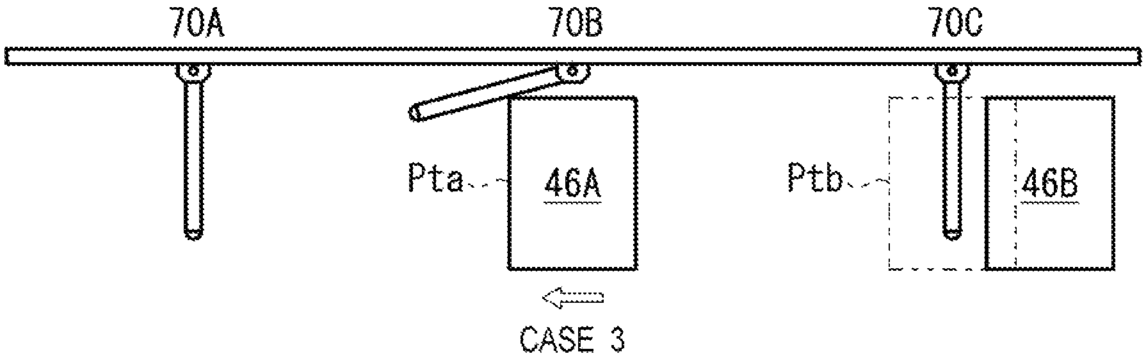
FIG. 19A is a diagram illustrating an example of a movement pattern for avoiding collision of the rotated guide member with the sheet processing unit in Case 3 illustrated in FIGS. 14A and 14B.
Figure 19B:
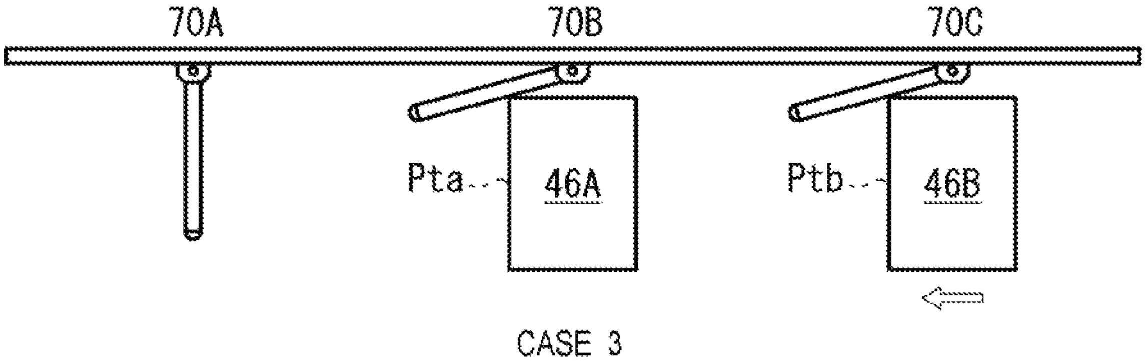
FIG. 19B is a diagram illustrating an example of a movement pattern for avoiding collision of the rotated guide member with the sheet processing unit in Case 3 illustrated in FIGS. 14A and 14B.

FIGS. 19A to 19B are diagrams illustrating an example of a movement pattern for avoiding collision of the rotated guide member with the sheet processing unit in Case 3 illustrated in FIGS. 14A and 14B.

First, in the movement pattern in Case 3, as illustrated in FIG. 19A, the sheet processing unit 46A starts to move toward the target position Pta on the left side thereof. At this time, the sheet processing unit 46B maintains the stopped state.

As illustrated in FIG. 19A, when the sheet processing unit 46A reaches the target position Pta or when the inter-unit distance Du between the sheet processing units 46A and 46B becomes larger than the safe distance Ds, the sheet processing unit 46B starts to move to the left side. As a result, as illustrated in FIG. 19B, the sheet processing unit 46A can reach the target position Pta, and the sheet processing unit 46B can reach the target position Ptb while avoiding the collision.

With such a movement pattern of the sheet processing units 46A and 46B, it is possible to avoid the collision of the guide member 70C rotated by the contact with the sheet processing unit 46B with the sheet processing unit 46A illustrated in FIG. 14B.

As a result of the simulation, when there are a plurality of movement patterns in which collision of the rotated guide member with the sheet processing unit can be avoided, the movement pattern calculator 94 finally outputs a movement pattern in which the time from when at least one of the plurality of sheet processing units 46A and 46B starts to move until both of the sheet processing units reach the respective target positions Pta and Ptb is the shortest.

Returning to FIG. 11, the drive motor controller 88 moves the sheet processing units 46A and 46B based on the movement pattern calculated and output by the movement pattern calculator 94. As a result, the sheet processing units 46A and 46B are arranged at the target positions Pta and Ptb while avoiding collision of the rotated guide member with the sheet processing unit.

According to the present embodiment as described above, in the sheet processing apparatus including the plurality of sheet processing units movable in the direction intersecting the conveyance direction of the sheet and the guide member that supports the sheet and rotates by contact with the sheet processing unit, it is possible to avoid collision of the guide member rotated by contact with one sheet processing unit with another sheet processing unit.

While the present disclosure has been described with reference to the above-described embodiment, the embodiment of the present disclosure is not limited thereto.

For example, in the case of the above-described embodiment, as illustrated in FIG. 10, the sheet processing apparatus 10 includes two sheet processing units 46A and 46B and three guide members 70A to 70C. However, the embodiment of the present disclosure is not limited thereto. There may be at least two sheet processing units, and there may be three or more, for example. It suffices that there is at least one guide member.

In the case of the above-described embodiment, as preconditions for the collision determination unit 90 to perform collision determination, there are a first precondition in which the sheet processing units 46A and 46B simultaneously start to move toward the respective target positions Pta and Ptb, and a second precondition in which the sheet processing units 46A and 46B move toward the respective target positions Pta and Ptb at the same speed. However, the embodiment of the present disclosure is not limited thereto. For example, when a plurality of sheet processing units are driven by one common drive source, and the plurality of sheet processing units and one drive source are connected by a power transmission switching mechanism such as a clutch, the plurality of sheet processing units move one by one. In this case, the collision determination unit performs the collision determination without the first and second preconditions.

Further, in the case of the above-described embodiment, as illustrated in FIG. 7, each of the sheet processing units 46A and 46B includes, as a processing tool, rotary cutting blades 60 and 62 that cut the sheet S in the conveyance direction F (X-axis direction) of the sheet S. However, the embodiment of the present disclosure is not limited thereto.

Figure 20:
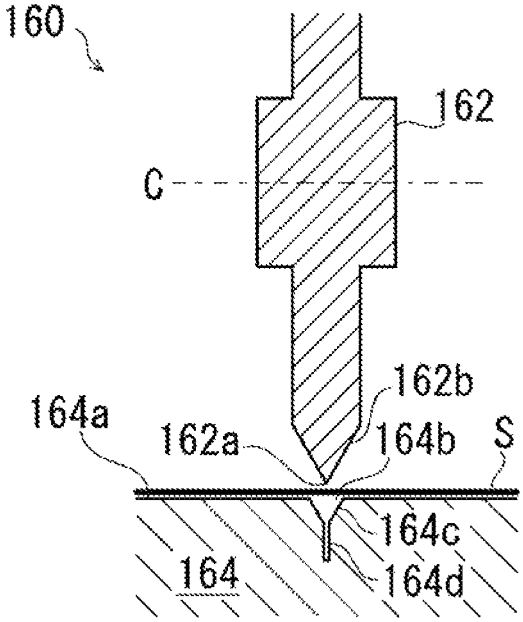
FIG. 20 is a diagram schematically illustrating a processing tool of another example mounted on a sheet processing unit.

FIG. 20 is a diagram schematically illustrating a processing tool of another example mounted on the sheet processing unit.

As illustrated in FIG. 20, the sheet processing unit mounts a processing tool 160 that performs perforation processing on the sheet S. Note that perforation processing is punch processing of punching the sheet S so that a plurality of rectangular through holes are formed in a line at intervals.

The processing tool 160 includes a perforation forming blade 162 and a die 164 facing the perforation forming blade 162 across the sheet S.

The perforation forming blade 162 is a rotary blade that rotates about a rotation center line C, and includes a circular cutting edge 162*a* that is partially divided as viewed in the extending direction of the rotation center line C. In a cross-sectional view parallel to a plane including the rotation center line C, the perforation forming blade 162 includes a V-shaped outer peripheral end 162*b*.

The die 164 has a block shape, and includes a groove 164*b* having a Y-shaped cross section extending in the tangential direction (direction perpendicular to the drawing) of the perforation forming blade 162 on a sheet placement surface 164*a* facing the perforation forming blade 162. The Y-shaped groove 164*b* is formed by a V-shaped groove part 164*c* and a rectangular groove part 164*d* formed at the bottom of the V-shaped groove part 164*c* and having a rectangular cross section.

When the sheet S is punched, the perforation forming blade 162 enters the V-shaped groove part 164*c* of the groove 164*b*. Then, the cutting edge 162*a* of the perforation forming blade 162 is disposed in the rectangular groove part 164*d* of the groove 164*b*. As a result, contact of the cutting edge 162*a* of the perforation forming blade 162 with the bottom of the groove 164*b* is curbed, and abrasion and chipping of the cutting edge 162*a* are curbed. In addition, generation of burrs protruding from the opening edges of the perforations toward the back side of the sheet S is curbed.

Note that the die of the processing tool that performs the perforation processing may have an adjustable groove width.

Figure 21:
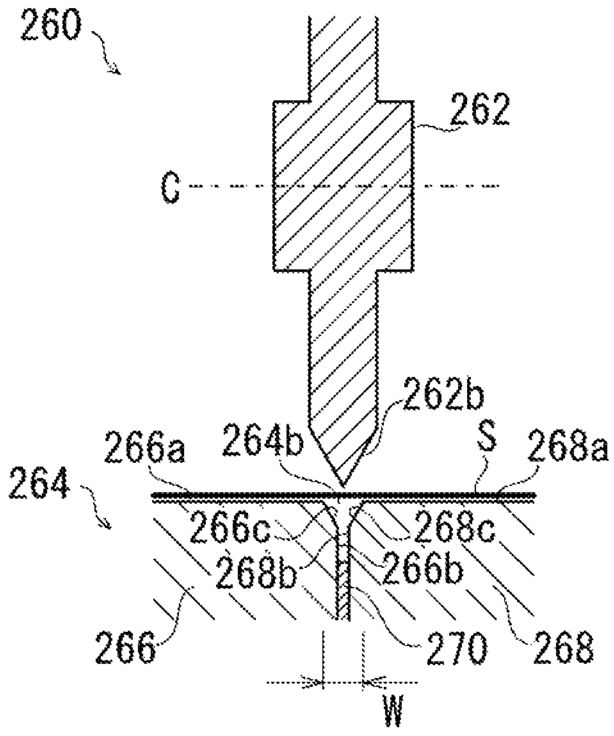
FIG. 21 is a diagram schematically illustrating a processing tool for perforation processing in which the groove width of the die is adjustable.

FIG. 21 is a diagram schematically illustrating a processing tool is for perforation processing in which the groove width of the die is adjustable.

A processing tool 260 illustrated in FIG. 21 includes a perforation forming blade 262 having a V-shaped outer peripheral end 262*b* substantially the same as that of the perforation forming blade 162 illustrated in FIG. 20, and a die 264 in which a groove width W is adjustable. The die 264 includes two die blocks 266 and 268 and a spacer 270 disposed therebetween. The one die block 266 includes an inclined surface 266*c* between a sheet placement surface 266*a* and a facing surface 266*b* facing the other die block 268. The other die block 268 includes an inclined surface 268*c* between a sheet placement surface 268*a* and a facing surface 268*b* facing the one die block 266. The spacer 270 is sandwiched between the facing surfaces 266*b* and 268*b* of the two die blocks 266 and 268. By disposing the spacer 270 having a different.thickness between the two die blocks 266 and 268, the groove width W of a Y-shaped groove 264*b* of the die 264 can be adjusted. As a result, the width of the perforation can be adjusted.

Note that the perforation processing may be formed in the conveyance direction F (X-axis direction) of the sheet S or in a direction (Y-axis direction) intersecting the conveyance direction F. When the perforation is processed in the direction intersecting the conveyance direction F, the perforation forming blade may be a blade that forms the perforation on the sheet S by moving up and down in the thickness direction (Z-axis direction) of the sheet S, instead of the rotary blade. In this case, the sheet placement surface of the die is provided with a groove extending in a direction intersecting the conveyance direction F and having a Y-shaped cross section.

As described above, the processing tool mounted on the sheet processing unit can be changed depending on the type of sheet processing required. For example, other sheet processing includes processing of forming a linear dent for easily folding a sheet, processing of forming a round hole, and the like.

Further, in the case of the above-described embodiment, the processing tools 60 and 62 illustrated in FIG. 7 are rotary cutting blades that cut the sheet S in the conveyance direction F (X-axis direction) of the sheet S, but the embodiment of the present disclosure is not limited thereto. For example, the processing tool may be a rotary cutting blade that rotates about a rotation center line extending in the sheet conveyance direction. The processing tool may be a shearing blade that moves in the thickness direction of the sheet instead of rotating to cut the sheet. Further, the processing tool mounted on each of the plurality of sheet processing units may be a processing tool that performs different sheet processing.

Furthermore, in the above-described embodiment, an example has been described in which the guide member in contact with one sheet processing unit rotates, and another sheet processing unit collides with the guide member in a rotating state, that is, a collision involving two sheet processing units. However, the embodiment of the present disclosure is not limited thereto. For example, when one sheet processing unit moves while rotating a guide member, and the sheet processing unit changes direction immediately after the contact with the guide member is released, the sheet processing unit may collide with the tip end of the guide member. In order to prevent such collision, as illustrated in FIG. 16A, the rotation range R of the guide member is defined by the radius r larger than the size of the guide member. Since the guide member can return to the original orientation by the sheet processing unit changing direction outside the rotation range R, it is possible to avoid the sheet processing unit having changed direction from colliding with the tip end of the guide member. The collision determination unit 90 may also determine whether or not there is a possibility of occurrence of such a collision related to one processing unit. In addition, the movement pattern calculator 94 may calculate a movement pattern for avoiding such collision.

That is, in a broad sense, an embodiment of the present disclosure is a sheet processing apparatus including: a conveyance unit that conveys a sheet in a first direction; at least one of sheet processing units that is movable along one movement path extending in a second direction intersecting the first direction in plan view of the sheet; a guide member that supports the sheet from below, the guide member including a fixed end that is at least rotatable about a rotation center line extending in a vertical direction and disposed at a position out of the movement path; a biasing member that biases the guide member so as to return to an original orientation in which a part of the guide member is located on the movement path; a controller that controls movement of the plurality of sheet processing units; and a collision determination unit that determines, before the controller moves at least one of the sheet processing units and based on a movement start position and a target position of a movement target sheet processing unit and a size and an orientation before start of movement of the guide member, whether or not there is a possibility of occurrence of collision of the movement target sheet processing unit with the guide member in a rotating state.

As described above, the embodiment has been described as an example of the technology of the present disclosure. For this purpose, the accompanying drawings and the detailed description have been provided. Accordingly, the components described in the accompanying drawings and the detailed description may include not only components essential for solving the problem but also components that are not essential for solving the problem in order to illustrate the above technology. Hence, it should not be immediately recognized that these non-essential components are essential based on the fact that these non-essential components are described in the accompanying drawings and the detailed description.

Since the above-described embodiment is intended to illustrate the technology of the present disclosure, various changes, replacements, additions, omissions, and the like can be made within the scope of the claims or equivalents thereof.

The present disclosure is applicable to a sheet processing apparatus capable of processing a sheet while conveying the sheet.

What is claimed is:

1. A sheet processing apparatus comprising:

a conveyance unit that conveys a sheet in a first direction;

at least one sheet processing unit that is movable along one movement path extending in a second direction intersecting the first direction in plan view of the sheet;

a guide member that supports the sheet from below, the guide member including a fixed end that is at least rotatable about a rotation center line extending in a vertical direction and disposed at a position out of the movement path;

a biasing member that biases the guide member so as to return to an original orientation in which a part of the guide member is located on the movement path;

a controller that controls movement of the at least one sheet processing unit; and a collision determination unit that determines, before the controller moves the at least one sheet processing unit and based on a movement start position and a target position of a movement target sheet processing unit and a size and an orientation before start of movement of the guide member, whether or not there is a possibility of occurrence of collision of the movement target sheet processing unit with the guide member in a rotating state.

2. The sheet processing apparatus according to claim 1, wherein the collision determination unit determines whether or not there is the possibility of the occurrence of the collision on a precondition that the movement target sheet processing unit starts to move toward the target position simultaneously.

3. The sheet processing apparatus according to claim 1, wherein the collision determination unit determines whether or not there is the possibility of the occurrence of the collision on a precondition that the movement target sheet processing unit moves toward target positions of the movement target sheet processing units at a same speed.

4. The sheet processing apparatus according to claim 1, further comprising a notifier that notifies the occurrence of the collision when the collision determination unit determines that there is the possibility of the occurrence of the collision.

5. The sheet processing apparatus according to claim 4, wherein the notifier gives notification of a guide member that is a target of the collision.

6. The sheet processing apparatus according to claim 4, wherein the notifier gives notification of a method of avoiding the collision.

7. The sheet processing apparatus according to claim 1, further comprising a movement pattern calculator that calculates movement patterns of the target movement sheet processing units avoiding the collision based on movement start positions and target positions of the movement target sheet processing units and a safe distance between the sheet processing units, wherein the safe distance is a distance between sheet processing units at which, when one sheet processing unit is located at a position where the guide member is maximally rotated, another sheet processing unit does not come into contact with the guide member, and the controller controls movement of the sheet processing units based on the movement patterns.

8. The sheet processing apparatus according to claim 7, wherein the movement pattern calculator calculates a movement pattern in which, after setting a distance between the sheet processing units to the safe distance or more, the movement target sheet processing unit moves toward a target position.

9. The sheet processing apparatus according to claim 7, wherein the movement pattern calculator calculates a movement pattern in which, when the at least one sheet processing unit of two adjacent sheet processing units approaches the other sheet processing unit and changes a movement direction after approaching, and a distance between the sheet processing units reaches the safe distance or more, the other sheet processing unit starts to move toward a target position.

10. The sheet processing apparatus according to claim 1, further comprising a movement pattern calculator that calculates a movement pattern of the movement target sheet processing unit avoiding the collision based on a movement start position and a target position of the movement target sheet processing unit, wherein the movement pattern calculator calculates a movement pattern in which, after the movement target sheet processing unit moves and releases contact with one guide member, the sheet processing unit changes a movement direction after the guide member returns to the original orientation.

* * * * *